Inventor
Eugene T. Lake
By his attorneys
Howson and Howson

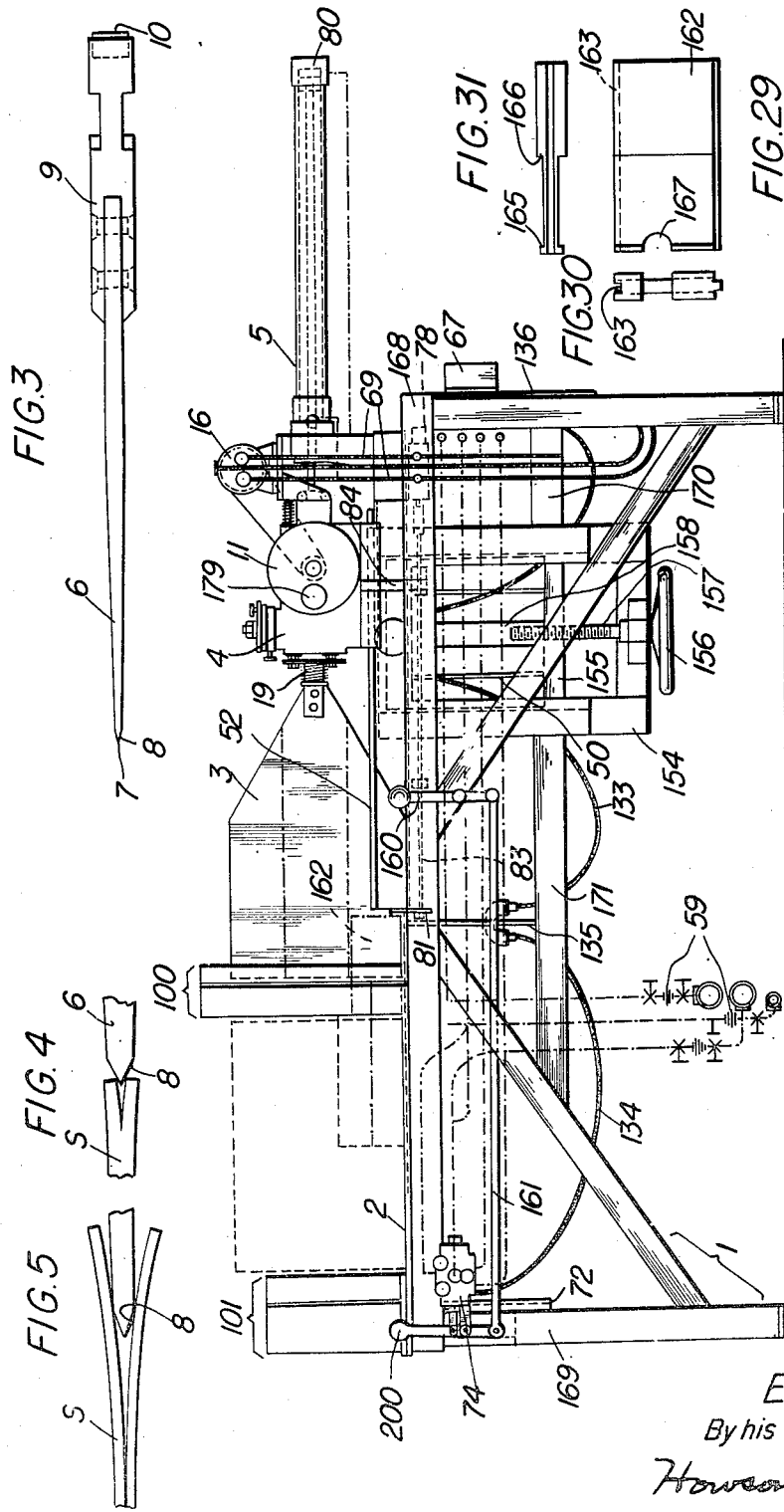

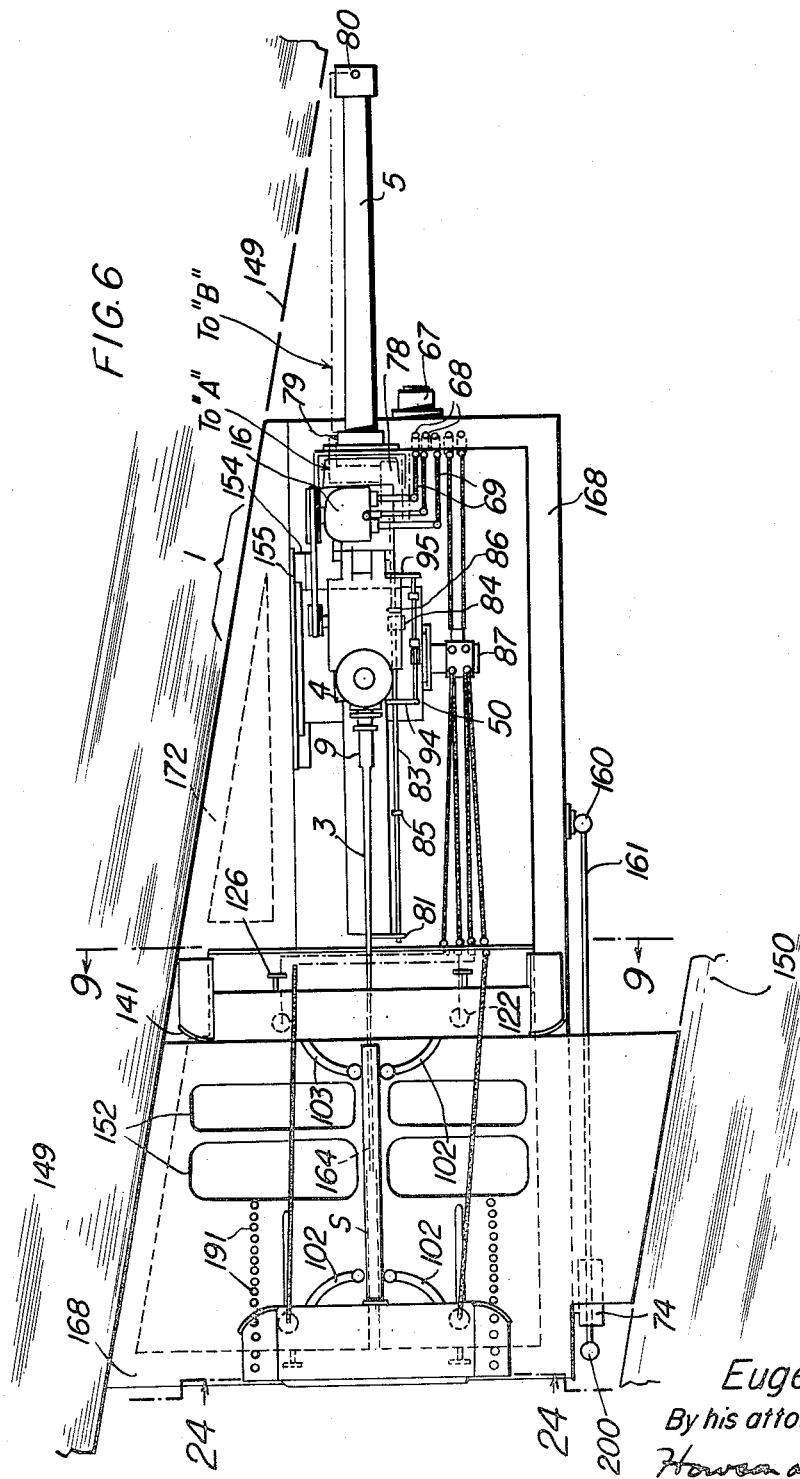

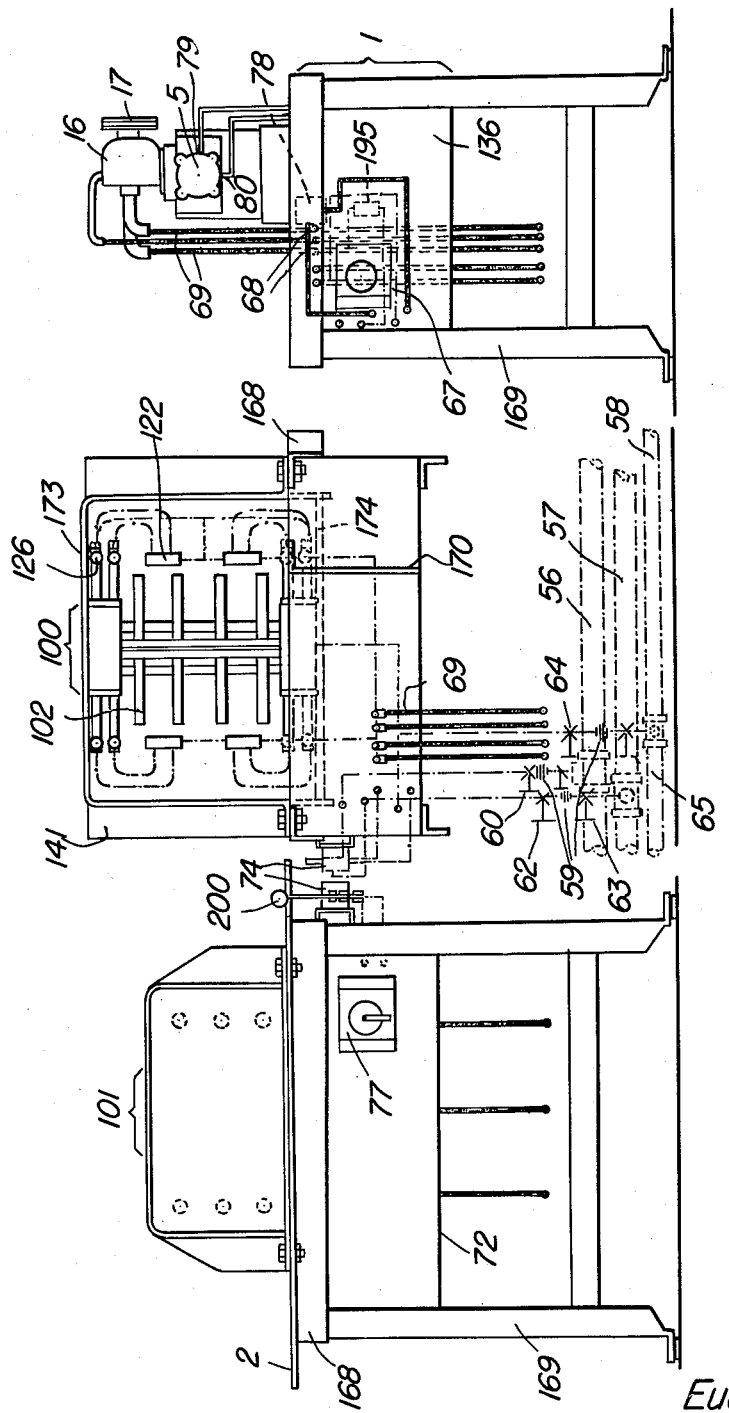

Jan. 27, 1953 E. T. LAKE 2,626,597
SLATE SPLITTING MACHINE
Filed Dec. 23, 1950 12 Sheets-Sheet 6

Inventor
Eugene T. Lake
By his attorneys
Howson and Howson

Jan. 27, 1953  E. T. LAKE  2,626,597
SLATE SPLITTING MACHINE
Filed Dec. 23, 1950  12 Sheets-Sheet 7
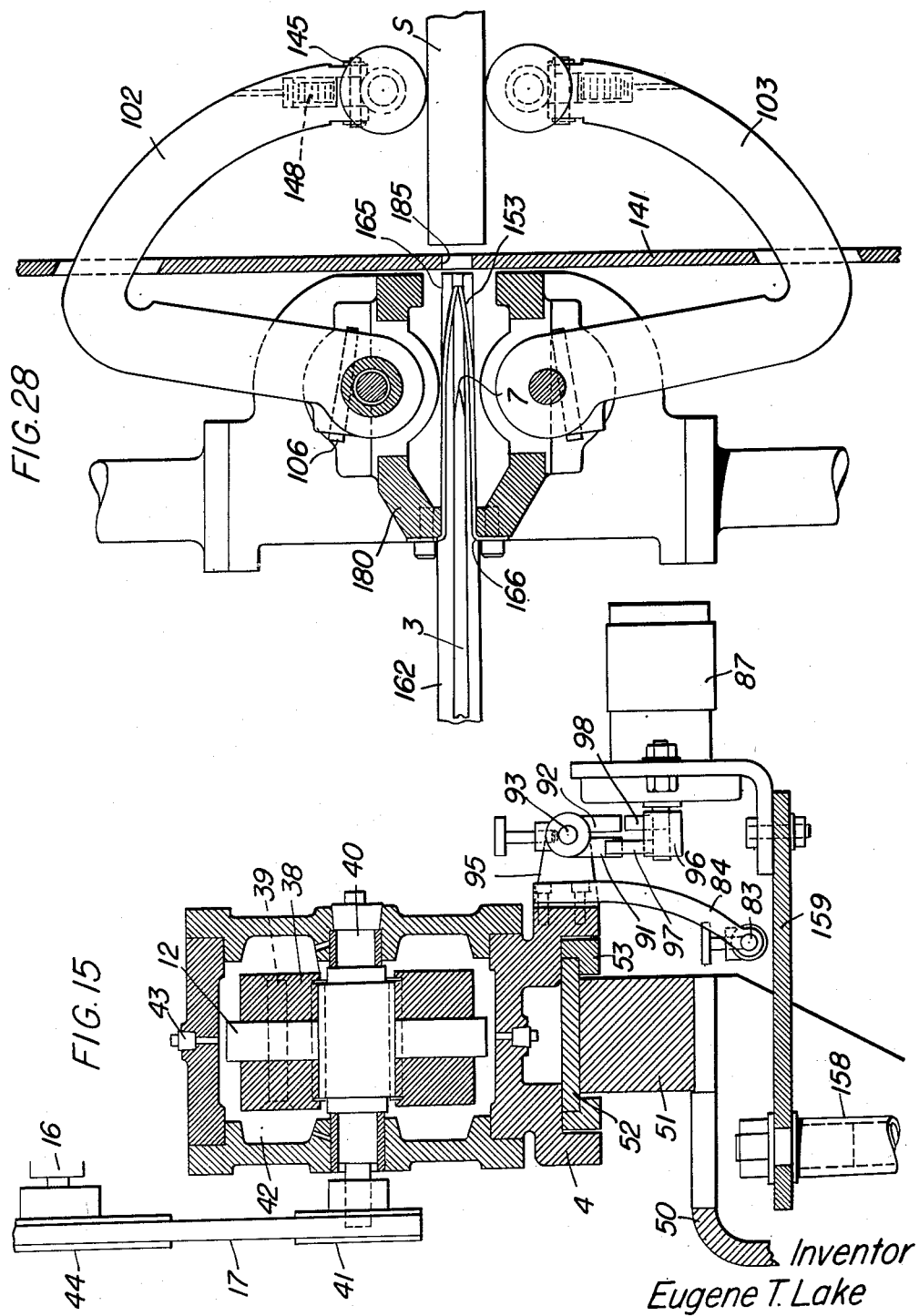

Jan. 27, 1953  E. T. LAKE  2,626,597
SLATE SPLITTING MACHINE
Filed Dec. 23, 1950  12 Sheets-Sheet 8
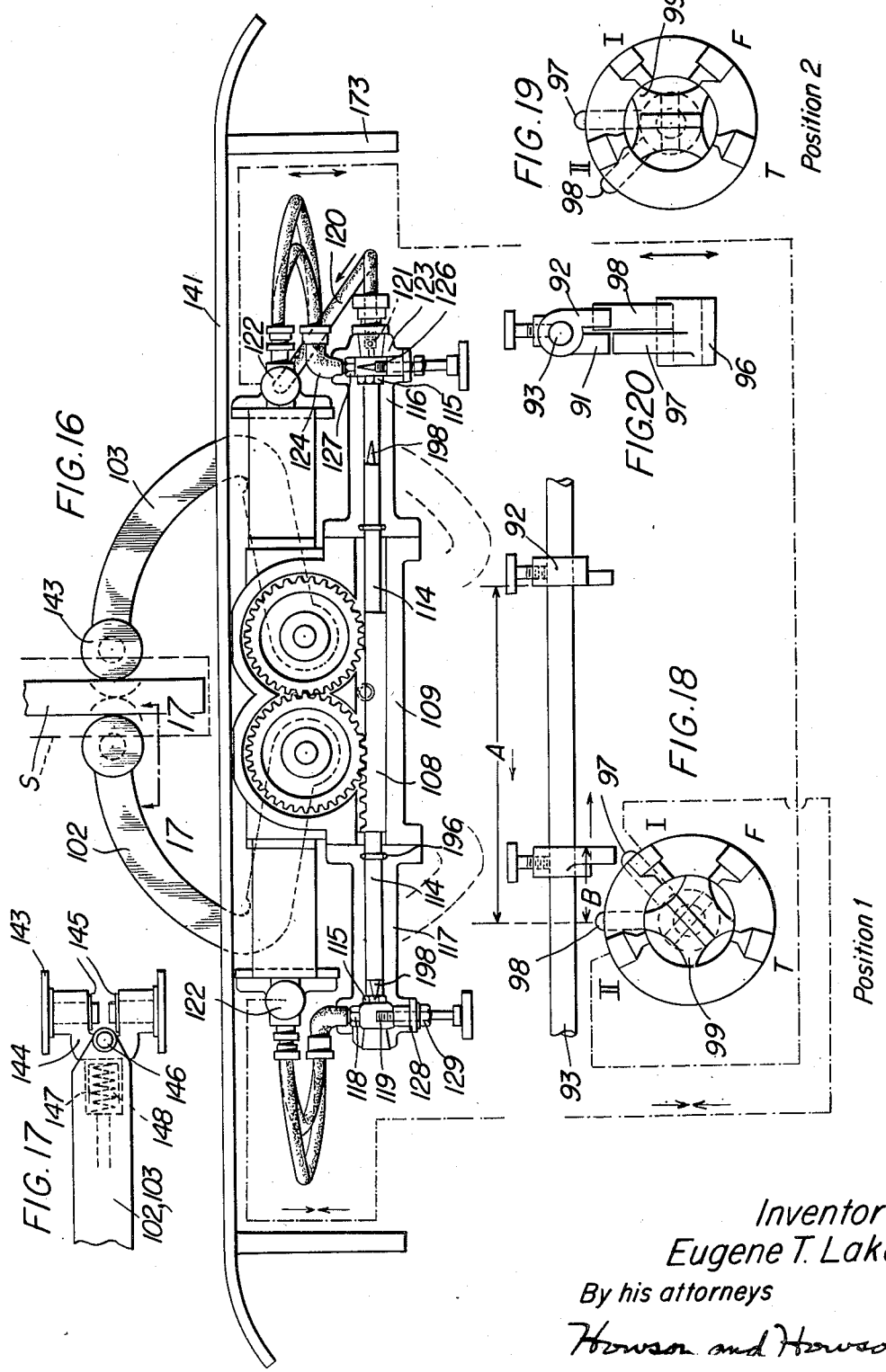
Inventor
Eugene T. Lake
By his attorneys
Howson and Howson

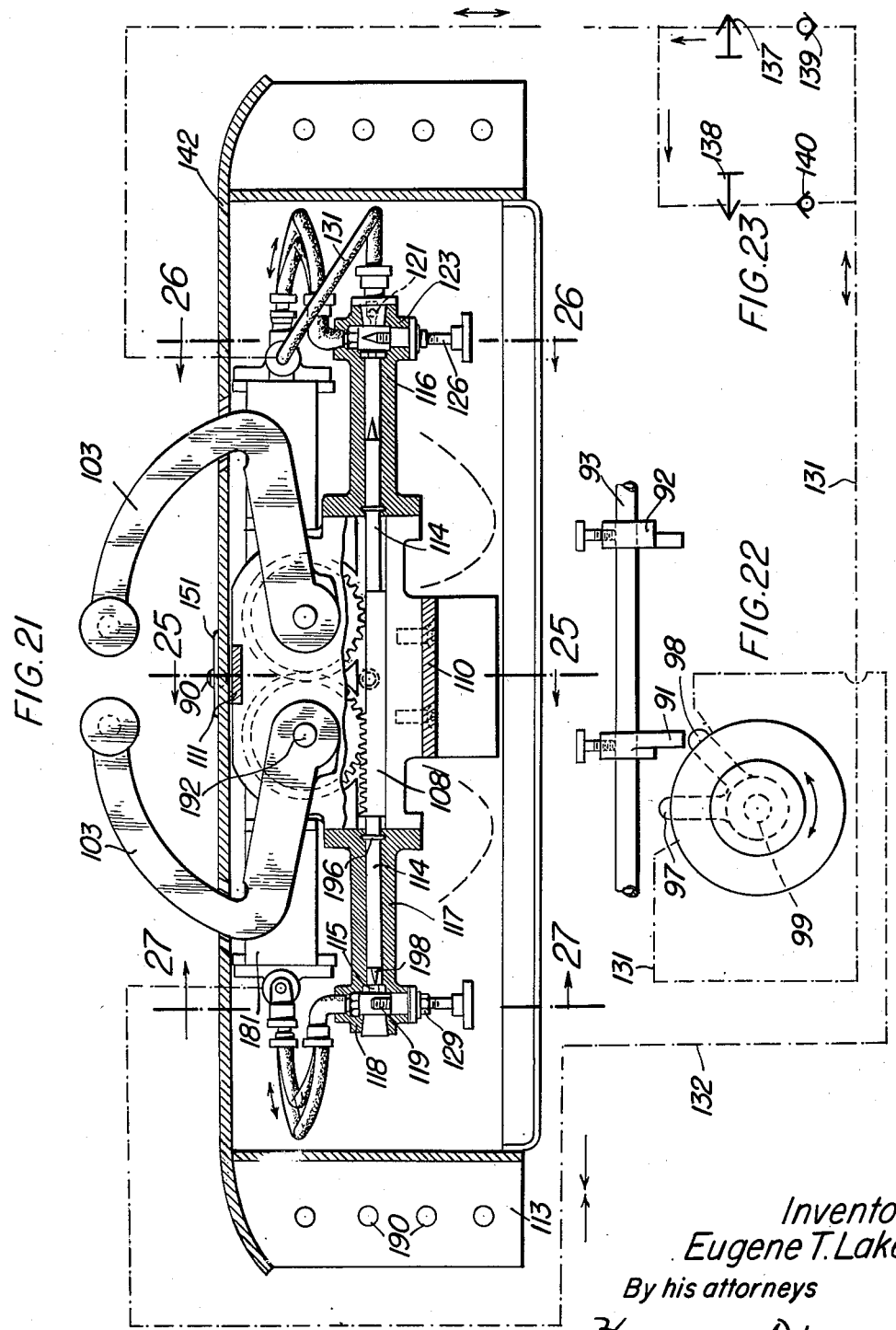

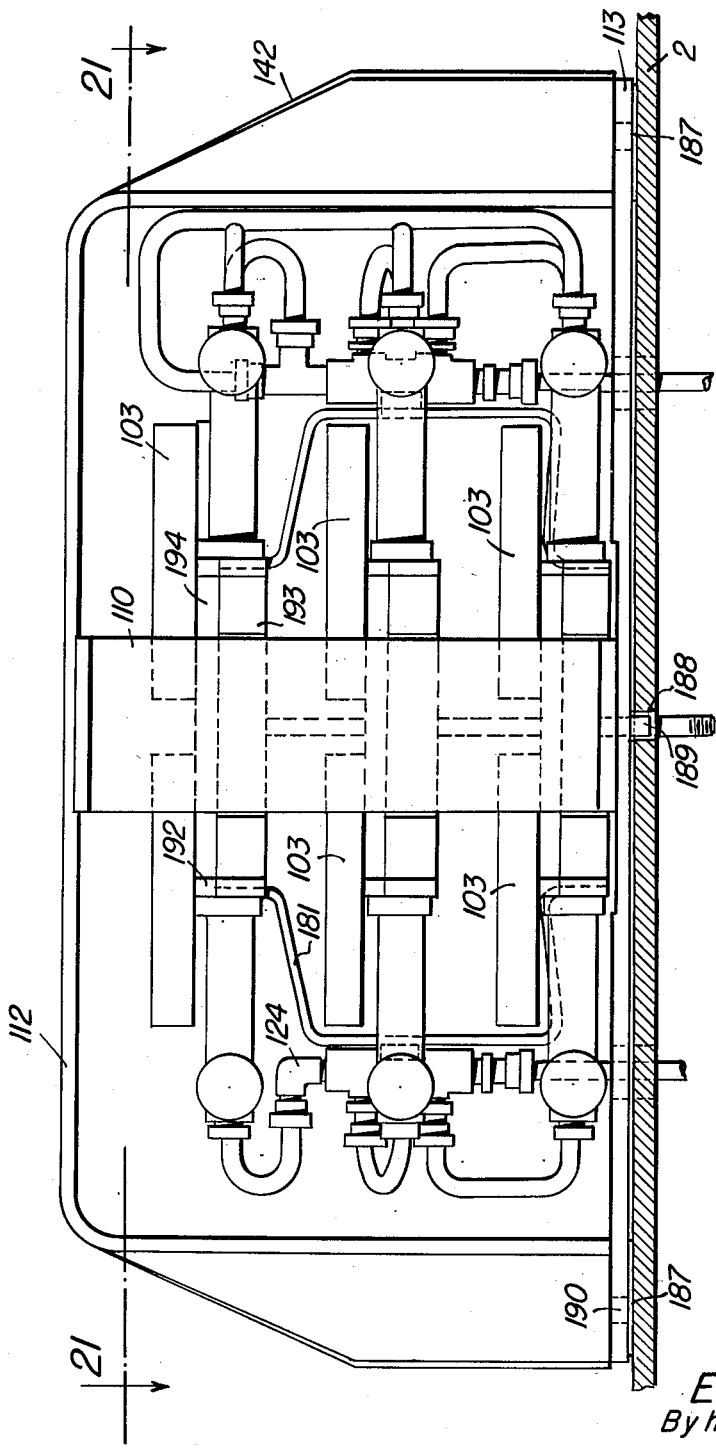

Jan. 27, 1953 E. T. LAKE 2,626,597
SLATE SPLITTING MACHINE
Filed Dec. 23, 1950 12 Sheets-Sheet 11
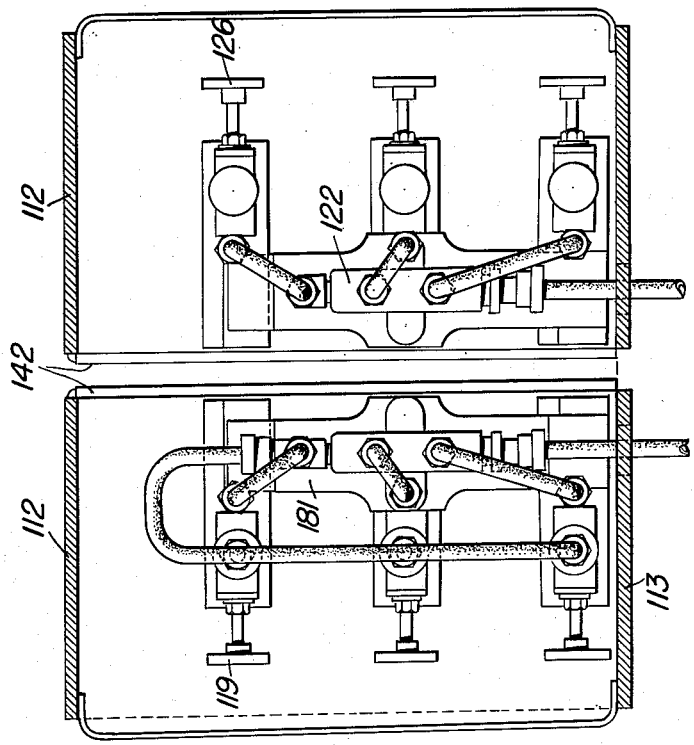
FIG.27
FIG.26
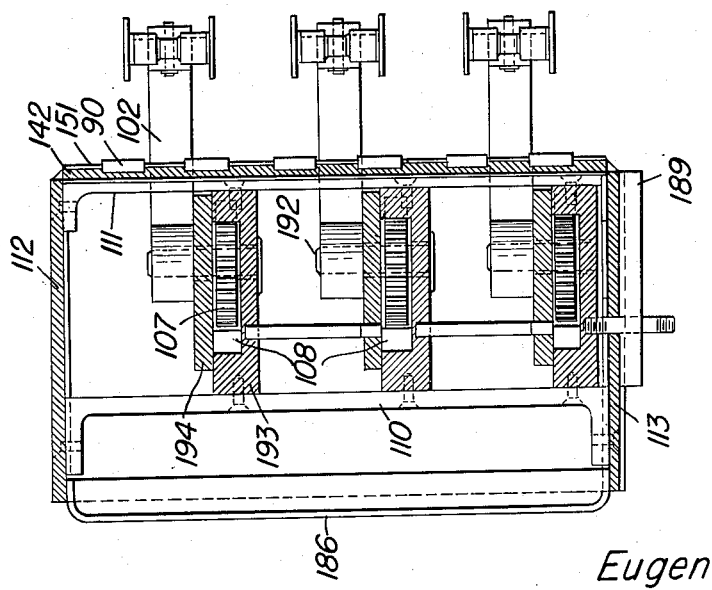
FIG.25
Inventor
Eugene T. Lake
By his attorneys
Howson and Howson

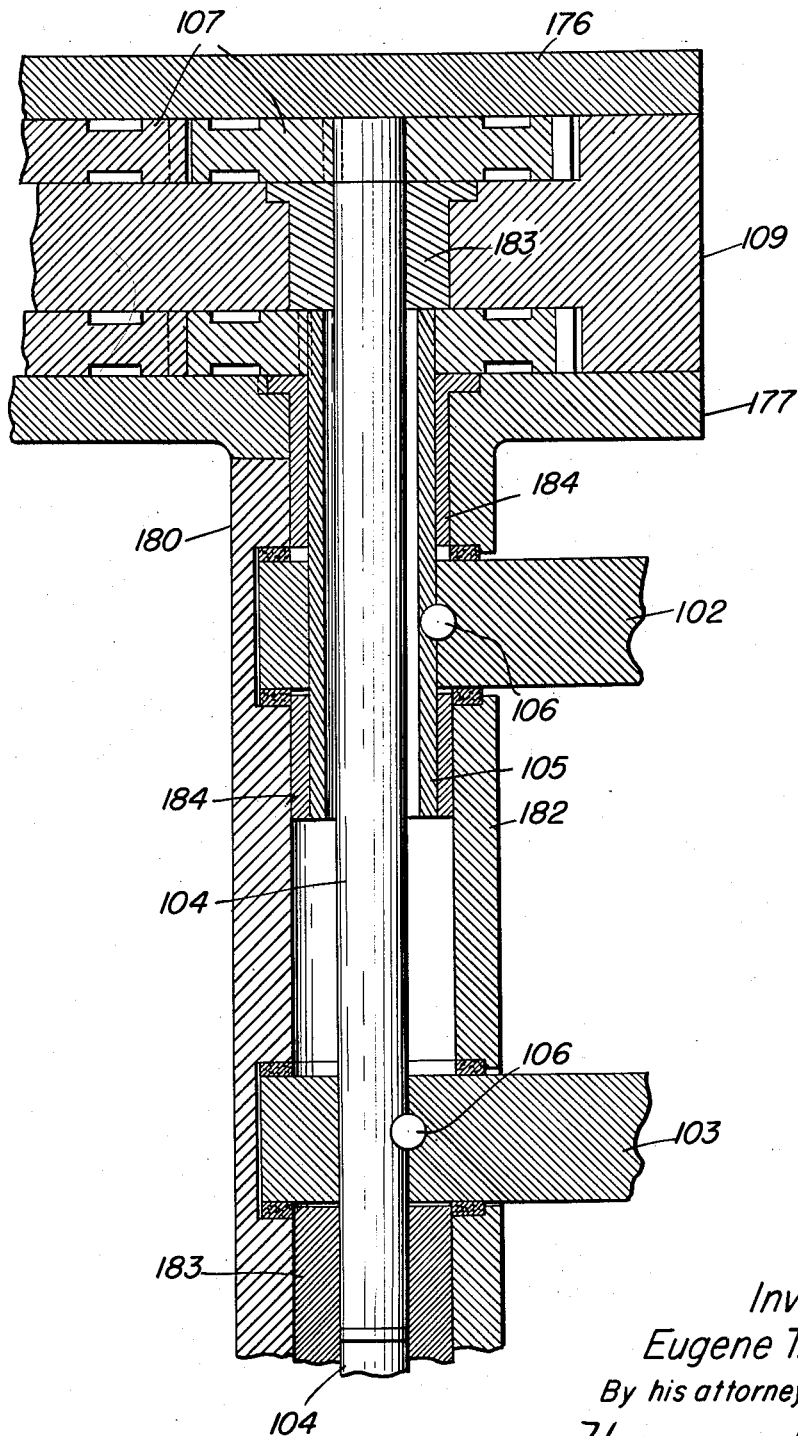

Patented Jan. 27, 1953

2,626,597

UNITED STATES PATENT OFFICE 2,626,597

SLATE SPLITTING MACHINE

Eugene T. Lake, Brodheadsville, Pa.

Application December 23, 1950, Serial No. 202,480

28 Claims. (Cl. 125—23)

My invention relates to a machine for producing slate shingles or the like from slabs by splitting slate slabs or blocks in the planes of cleavage. While certain features of my invention are applicable to all slate splitting machines, I will show and describe my invention embodied in a machine adapted to produce slate shingles from slabs having a thickness that is an even multiple of the thickness of the finished product. This machine is adapted to split slate along the center line of its thickness and I shall therefore hereinafter refer to it as the "center line splitter." In this specification where I use the term "slate" I refer to any kind of stone that can be split and thereby produce sheets.

The present invention is an improvement on the splitting machine shown in the U. S. patent to Vincent F. Lake No. 1,590,385, dated June 29, 1926. While the invention may be embodied in any of the splitting machines shown and described in my copending process application Ser. No. 158,748, filed April 28, 1950, it is the machine identified in that application as the final splitting machine which I have chosen as the embodiment to be shown and described in the present application. In that process application this machine is claimed as part of a larger apparatus. It is characteristic of the present application that the splitting machine is driven by fluid means. I have invented driving mechanism which operates much more satisfactorily and efficiently than previous slate splitting machines. My machine causes less breakage of the slate and can produce thinner sheets of slate than those heretofore known.

From time immemorial, the operation of splitting slate to produce shingles or the like from slabs or blocks has been done by hand with hammer and chisel. This requires great skill and the trade considers that a long apprenticeship is required to produce a good splitter. However, hand splitting of slate blocks is a slow and tedious operation involving a tremendous wastage of raw material. Furthermore, it is commercially impossible to produce extremely thin sheets of slate by hand splitting. It is also the opinion of practical slate men that when a quarried slab of slate has been out of the ground long enough for the "sap" to dry out, the stone cannot be split. In spite of this belief, however, I have found that splitting machines of the general type above referred to can be used to split quarried slabs which have been out of the quarry for a very long time. In fact, I have found that machines such as those described in the V. F. Lake Patent No. 1,590,385 can even split dried blocks of slate which, when they first come from the quarry in their wet condition, are too weak for splitting. My machine corrects the faults observed in the operation of machines built according to the V. F. Lake Patent 1,590,385, and is a simplified construction of increased reliability of operation, durability, speed and range of splitting.

In my father's Patent No. 1,590,385 above mentioned and in my present machine, the primary parts comprise a splitting tool such as a chisel, an automatic hammer means for applying a rapid succession of impulses to the chisel, and resilient means acting to hold the chisel out of operative contact with the hammer except when the tool encounters resistance in splitting the slate. Operating in conjunction with this primary splitting equipment are many other parts, but the machine has only three basic parts which require power to operate the machine. These three parts are the means for causing advancing of the hammer and chisel as the splitting takes place, means for reciprocating the chisel and means for operating the clamps which hold the slate in position for splitting. I use fluid drive means for all these three needs and obtain great advantages.

In the drawings:

Fig. 3 is a plan view of the chisel and shank of Figs. 1 and 2.

Fig. 4 is a diagram of the point of the chisel of Fig. 3 entering the slate at the beginning of a splitting action.

Fig. 5 is a diagram showing the split after the point has entered the slate until the shoulders of the point are engaged by the slate.

Fig. 6 is a plan view of a center line splitter built according to my invention; the front of the machine being to the left.

Fig. 7 is a view in elevation from the right side of the center line splitter of Fig. 6 and the preceding figures.

Fig. 8 is a simplified view in elevation from the front of the machine of Figs. 6 and 7.

Fig. 9 is a simplified view in vertical section through the machine of Fig. 7 between the hammer means and the main clamp, looking toward the latter on the line 9—9 of Fig. 6, with the chisel omitted.

Fig. 10 is a view in elevation from the rear of the machine of Figs. 6-9.

Fig. 12 is a detail view of one knob or corner on the hammer disc.

Fig. 13 is a detail view on a reduced scale of the regulating slide of Fig. 1 in elevation, taken at right angles to Fig. 1.

Fig. 14 is a detail view in cross-section through the carriage mounting of Fig. 1, showing the adjustment of the gibs which hold the hammer frame on the slide;

Fig. 15 is a view in cross-sectional elevation of the hammer and carriage of Fig. 1, taken through the middle of the hammer disc.

Fig. 16 is a simplified plan view of the main clamp showing one pair of arms and the associated rams, rack and gears with the carriage just after moving to the left, taken on the line 16-16 of Fig. 11 with the front of the machine at the top.

Fig. 17 is a detail plan view of the mounting of the clamping discs on the end of one of the arms of one of the slate clamps in the machine, taken on the line 17—17 of Fig. 16.

Fig. 18 is an enlarged diagram of the main clamp control valve and associated parts with the valve in its No. 1 position where the fluid is flowing to close the clamps and the carriage is just starting to move to the left.

Fig. 19 is a view showing the valve of Fig. 18 in No. 2 position for opening the clamps.

Fig. 20 is an end of the tripping rod, adjustable tappets and two-armed lever of the valve of Figs. 18 and 19 with parts in the position of Fig. 18 as viewed from the right.

Fig. 21 is a plan view similar to Fig 16 but of a front pair of clamp arms, with the back of the machine at the top.

Fig. 22 is an enlarged diagram of the front clamp valve and associated parts with the valve in its No. 1 position where the fluid is flowing to close the clamps and the carriage is just starting to move to the left.

Fig. 23 is a diagram connecting Figs. 21 and 22 to show the closing pipe line connections.

Fig. 24 is a view in front elevation of the front clamp and associated parts of the preceding figures, the view being similar to Fig. 9 with the portable cover removed, and taken on the line 24—24 of Fig. 6.

Fig. 25 is a view in elevation of the front clamp and associated parts taken on a section line through the longitudinal center of the machine and on the line 25—25 of Fig. 21.

Fig. 26 is a view in elevation similar to Fig. 25 but taken on the right side of the machine and on the line 26—26 of Fig. 21; the side of the frame and the clamping arms being omitted.

Fig. 27 is a view in elevation similar to Figs. 25 and 26 but taken on the left side of the machine and on the line 27—27 of Fig. 21, the side of the frame and the clamping arms being omitted.

Fig. 28 is a view in horizontal section through the main clamp, showing how the arms are mounted on the hollow and solid shafts, taken on the line 28—28 of Fig. 11 but omitting hydraulic connections and the front of the machine being to the right.

Figs. 29, 30 and 31 are views of a special support employed when a narrow chisel blade is used; Fig. 29 being a side elevation, Fig. 30 an end elevation and Fig. 31 a view of the part in plan; while Fig. 32 is a view in vertical section through the hollow and solid shafts of the main clamp of Fig. 28.

*The frame of the machine*

Figure 1:
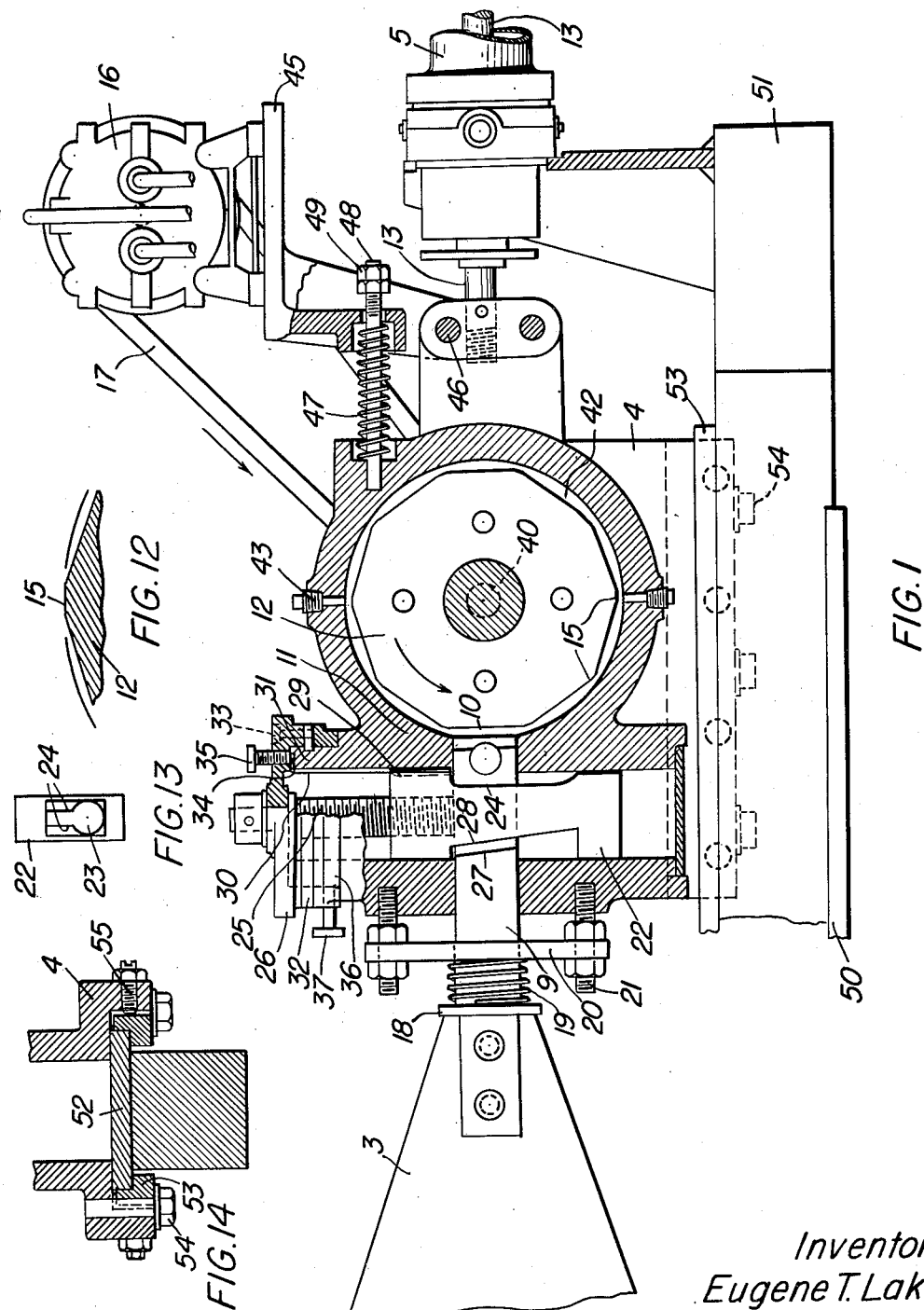
Fig. 1 is a view in longitudinal elevation of the chisel, hammer means, carriage and fluid cylinder of a slate splitting machine made according to my invention; the chisel being shown pushed out clear of the hammer, with the regulating slide in its lowermost position.

The frame 1 of the machine can be seen in plan in Fig. 6; and views in elevation are shown in Figs. 7, 8, 9 and 10. It is made of angle irons and plates welded together. The angular part of the frame consists of a quadrangular top 168 of angle iron to which four legs 169 are welded. At the bottom of each leg one of the flanges is cut away and the other flange is bent outwardly at right angles and reinforced and drilled to form feet or to attach the machine to the floor. The legs are braced as shown in Figs. 7-10. Transverse stiffener plates can be used for this purpose. I show a front stiffener plate 72, a middle stiffener plate 135 and a rear stiffener plate 136. There also can be a longitudinal plate stiffener 170, a longitudinal angle stiffener 171 on each side and a top plate stiffener 172, if desired.

The front transverse stiffener plate 72 is U-shaped with the legs widely spaced (Figs. 7 and 8). The legs are welded to the side flanges of the front legs so as to form a recess below the top plate for the cylinder flow control valve 77 or any other valves or other features that may be desired.

The middle transverse stiffener plate 135 is welded to the top flange of the top 168 of the frame and also to the bottom flange of the longitudinal angle stiffeners 171 and the longitudinal plate stiffener 170 and the top plate stiffener 172.

The rear plate stiffener 136 is welded to the top angle frame 168 and the two rear legs 169. It also carries the rear end of the longitudinal plate stiffener 170. The flexible pipes 134, 133 and 69, and the fittings 68 for them, can be mounted on these transverse stiffeners.

At the front end of the frame of the machine is bolted the slate support or table top 2, this being attached to the frame top 168.

The table top 2 may be fitted with balls or rollers as described in my father's above-mentioned Patent No. 1,590,385, if desired. But I have found that it is not desirable to divide the table top into sections as described in that patent because the front clamp has to be moved over the top of table 2 and be bolted down. There are holes 191 in this table top for bolting down the front clamp (see Fig. 6). In addition there are slots in the frame parts to provide for movement of the flexible hose connected to the front clamp set. It is desirable to provide an easier way to grasp slate slabs to raise them into splitting position and to lay the shingles to the right as they are split and also to move them to the delivery or outgoing conveyor 150. I do this by providing hand holes 152 through the table top by which the hand may reach through and grasp the edge of the slate to be raised. These holes, of course, will also be useful for laying down the slates after splitting. The holes should be so located that they are clear of the sweep of the clamp arms.

Splitting slate by machine

In order to understand some of the efficiencies resulting from my novel machine, I will now set forth some observations based on my recent experiences with regard to splitting slate by machine. I have found that the force of each blow required to advance the chisel into the slate is very much greater at the beginning of the split than after the split has started. In other words, it apparently takes a greater number of blows to start the split than to continue it. However, the initial maximum force required of each blow can be greatly decreased when splitting by machine if the rate at which the blows are given is increased. This fact is of very great importance when splitting slate into very thin sheets. It is particularly important because a thin slate when bent is not capable of standing much pressure in a direction parallel to its surface and is very easily broken when so bent. For this reason, among others, I use as high a number of blows as is practical. As a result, the thinner slates are not stressed beyond their breaking points.

Actual experience with my type of hammer and chisel shows that it is possible to give as many as 25,000 to 30,000 blows per minute, or even more. As will be seen when the construction of my machine is described, when the hammer and chisel first start the operation, the reciprocations of the chisel are very short and extremely rapid. As the penetration into the slate increases, the reciprocatory movements of the chisel become longer and the construction of my machine is such that the interval between successive blows also becomes longer. It should be noted that for these and other reasons my construction is peculiarly fitted to automatically adapt itself to provide the different types of action required during the making of a split.

In both the machine of the above-mentioned Lake patent and my present machine the slab or block of slate is so placed that the plane of cleavage which is being split is in a vertical direction. In the embodiment illustrated in the drawings of the present application the frame 1 of the machine has a flat table or support 2 on which the slab of slate is placed. There is a chisel 3 with its cutting edge also vertically arranged and adapted to be pressed against the edge of the slab in repeated rapid blows received from a hammer means in back of the chisel. The chisel and hammer means are mounted in a unitary manner on a carriage 4 so as to move forward together as a split proceeds and to retire together when the split is completed. Pressure is applied to the carriage to advance it. My pressure means are novel and advantageous over those heretofore known. I reciprocate the carriage by means of a cylinder 5. I use fluid drive means to push the piston of this reciprocation cylinder back and forward, as hereinafter explained. These means have a self-controlled maximum rate of movement due to admitting the fluid to the cylinder at a controlled date. In this way the pressure of the chisel against the slate is controlled at all times and is never more than required to continue the splitting operation. This pressure has an adjustable maximum and therefore, if the chisel jams, enables the machine to stall rather than break.

Chisel and hammer means

The splitting tool which I use is the chisel shown in Figs. 3, 4 and 5. It will be noted that the sides of the blade are tapered into flanks 6 near the cutting edge 7 but that at the actual edge shoulders 8 are formed by making a sharp point of higher angle. As a result, while the split in the slate is started by the actual edge 7 of the blade as shown in Fig. 4, as the split grows the slate rides up onto the shoulders 8 and the split is continued by a wedging action as shown in Fig. 5.

I will now describe the hammer means and its interrelation with the chisel. This should make clear the relation of the length of the reciprocation of the chisel to the rapidity with which the blows are given.

As shown in Fig. 1, the chisel 3 is riveted at its back end to a chisel shank 9 which extends rearwardly beyond the chisel to a point within range of the hammer means. There is a roller 10 on the rear end of this shank. The hammer means includes a casing 11 through which the shank passes to the interior where a hammer is located. The casing is part of the carriage 4. This hammer is a disc 12 which rotates about a center in line with both the shank 9 and the piston rod 13 of the reciprocating cylinder, but located between the two. The periphery of this disc is polygonal. The corners 15 of the polygon are preferably shaped somewhat as shown in Fig. 12 and are harder than the remainder of the disc. The disc is adapted to be rotated by a motor 16 and a V-belt 17 connects the motor to the disc. The motor may be fluid-driven. The shank is free to slide in the casing. Adjacent to the back end of the chisel is a spring washer 18 on the shank. Against it rests one end of a resilient means, namely, a compression spring 19. This compression spring surrounds the shank. The other end of the spring rests against an abutment 20 surrounding the shank and supported by means of studs 21 on the casing.

It will be seen that when the hammer disc 12 is rotated at high speed, if the roller 10 on the shank of the chisel backs into the path of the corners 15 of the disc the corners will strike the roller in rapid succession, thereby applying a succession of forward impulses to the chisel. The intensity of the impacts will depend upon the extent to which the roller overlaps the path of the corners. The frequency of the blows will be affected by the rapidity with which the chisel returns to overlapping position after each blow. If the reciprocatory movement of the chisel is short it may return in time to be hit by successive corners. Otherwise one or more corners may pass before it returns to overlapping position.

In connection with the Lake patent above mentioned, it was originally thought there would be a rolling action between the rolls in the revolving hammer disc and the roll in the end of the shank (see Fig. 6 of that patent, parts 24 and 17). Experience with the actual machines shows that the rolls 24 of that patent did not revolve, while the parts 17 did. This demonstrated that the costly construction of fitting these rolls into the periphery of the disc was unnecessary. Furthermore, the thin edges embracing the rolls were weak and several of them broke. My hammer disc is designed on the theory that it is a hammer having several striking faces, that is, the corners 15. The hammer disc can be made as a polygon in which the sides intersect the periphery so as to leave short spaces of the cylindrical surface of the disc (see Fig. 12). These corners 15 are made hard like the surface of a hammer, while the rest of the disc is left in a soft but tough condition. This can be brought about by the selection of a proper grade of alloy steel with appropriate heat treatment. The result is a strong solid disc with no thin parts to break. If it is desired to inspect the disc, a hole 179 may be provided in the hammer casing 11.

I prefer to limit the extent of the reciprocatory movement of the chisel, and the amount of overlap between the driving and driven parts, by means of a regulating slide 22, somewhat as in the Lake patent above-mentioned. One effect of this slide is to regulate the intensity of the impacts on the chisel. It is desirable to vary this intensity according to the slate being worked on. The adjustment is obtained by vertical adjustment of the slide. The shank and slide are shaped and assembled as follows. The slide is a vertical cylinder larger in diameter than the shank 9 of the chisel. As can be seen in Fig. 13, there is a round opening 23 running horizontally through the slide near the bottom. By means of this the slide can be assembled on the shank in the general relation shown in Fig. 1. The shank is notched vertically on either side at the point where the slide is to be straddled (see Fig. 13). Except when in its uppermost position the slide engages the vertical flats on the shanks by means of the vertical sides or shoulders 24 which can be seen in Fig. 13. In this way the slide is kept in line with the shank. It will be seen from Fig. 1 that lengthwise of the shank these shoulders are not quite as wide as the notches of the shank in which they lie. This difference in dimension determines the length of the reciprocatory movement of the chisel. In order that the length of the reciprocation may be varied, one edge each of the notch and shoulder is vertical, while the other edge 27 of the shank and the other edge 28 of the slide are sloped downwardly toward the first-mentioned or vertical edge of each part. The lower the position of the slide, the wider is the portion of the shoulder opposite the notches in the shank and the more limited the possible movement of the roller 10 into the path of the hammer corners 15. The tapered sides being away from the hammer, it is the inner end of the travel of the chisel that is abbreviated when the slide is lowered, i. e., the portion of the travel which overlaps the disc.

The slide moves vertically in an extension of the hammer casing 11 (see Fig. 1). It is operated by a vertical regulating screw 25 whose lower end engages a thread in the top of the slide. To the upper part of the screw is secured a horizontal handwheel 26. In Fig. 1 the shank is shown as if pressed back a little, with the result that the spring 19 is compressed enough to move the inclined surface 27 of the shank away from the inclined surface 28 of the slide. The flat vertical surface of the shank is pressed against the flat vertical surface of the slide when the slide is in its lowest position. This holds the roller 10 just clear of the corners 15. In this position the left-hand inclined edges of the shank and slide are separated by say an eighth of an inch and the roller 10 is just tangent to the path of the corners 15 of the hammer disc. This would be the zero position of the index. If now, the slide is raised, any pressure on the chisel greater than the force of spring 19 will move the shank to the right in Fig. 1 until the inclined surfaces contact again. This movement pushes the roller 10 into the path of the corners of the disc according to the vertical movement of the slide 22. If the hammer disc is rotating, a series of rapid impulses will then be imparted to the chisel.

The slide 22 is prevented from turning by a key 29 which operates in a groove 30 cut in the bore in casing 11 in which the slide moves. This prevents the slide from rotating and jamming the shank. The handwheel 26 rests on top of the cylinder 31. The cylinder is the part of the casing in which the bore for the slide is formed. To hold the handwheel on the top of the cylinder the handwheel fits down around the outside of the cylinder. There is a divided retaining ring 32 screwed to the handwheel by screws 33. This ring fits into a circumferential groove on the outside of the cylinder. Spaced around the top of the cylinder are holes 34 and there is a thumb screw 35 in the handwheel adapted to fit into any selected one of these holes. This holds the handwheel on the cylinder of the casing. The holes 34 on the top of the cylinder are so spaced and the other parts of the mechanism so proportioned that the distance from the center of one hole to the center of the next corresponds to a permitted movement of .001 of an inch of the roller 10 into the path of the corners 15 of the hammer disc. Below the retaining ring 32 is an index ring 36 with markings corresponding to the spacing of the holes on the top of cylinder 31. There is a horizontal locking screw 37 by which an index zero mark can be set to a predetermined mark on the retaining ring 32 on the handwheel. To remove the chisel the thumb screw 35 is backed up and the handwheel turned clockwise as far as it will go. This raises the slide till the round opening 23 in the side is in line with the shank 9 of the chisel. The chisel shank 9 may then be withdrawn.

To check the zero setting of the slide, run it down as far as it will go. The roller 10 should now just be clear of the hammer disc if the setting is correct. Check it by placing a block of wood in the machine in place of a slab of slate and move the carriage up with the hammer disc rotating. If the hammer starts to "sing" before the chisel is firmly pressed against the wood, turn the handwheel counterclockwise until the "singing" stops. If the hammer does not "sing" before the chisel is pressed against the wood with the full force of the hydraulic cylinder 5, turn the handwheel clockwise until it does and then backward counterclockwise until it just stops. Then set the index to zero and secure it. The handwheel can then be turned to the desired degree and set, the carriage 4 backed off and the wooden block removed.

The hammer disc 12 can be increased in effectiveness, if desired, by the addition of disc weights 38 held on either side of the hammer disc by rivets 39 (Fig. 15). They are tight on the axle 40 with the hammer disc. They are driven from the V-belt 17 of the motor 16 by a pulley 41 on the axle 40. The discs are enclosed in a cavity 42 in the casing 11. For the maintenance of oil in the cavity plugged oil holes 43 can be placed at the top and bottom of the cavity. The V-belt 17 runs over a pulley 44 on the shaft of the motor 16. The motor itself is carried on a bracket 45 pivoted on the carriage 4 at a point 46. The bracket is L-shaped so as to carry the weight of the motor on the opposite side of the pivot point from the hammer casing 11. As a result the weight of the motor tends to keep the V-belt 17 tight. To assist in this there may be a compression spring 47 between the hammer casing and the bracket above the pivot point. This spring is on a pin 48 fixedly mounted in the casing but projecting through the bracket 45. On the far side of the bracket on the pin 48 are lock nuts 49 to prevent excess movement of the motor in case of belt breakage.

The manner in which the movable carriage 4 is mounted on the frame of the machine can be seen in Figs. 1 and 7 and in cross-section in Figs. 14 and 15. In order to provide for working on narrow slates or for the use of narrow chisels it is necessary that the center line of the chisel 3, carriage 4 and cylinder 5 be capable of vertical adjustment. This is provided by an elevator consisting of a bracket elevator support 50 mounted on a sliding frame 155 which slides in a frame 154 mounted on the longitudinal stiffener plate 170 (see Figs. 6, 7 and 9). The sliding frame 155 is raised and lowered by handwheel 156 supported on the stationary frame 154 and supported in a bearing with thrust collars secured thereon. This handwheel turns a vertical screw shaft 157 which works in an internally threaded tube 158 secured to the bracket 50 of the frame by another bracket 159 (see Fig. 15). On the elevator bracket support 50 is a stationary carriage slide support 51. On top of this slide support is fastened a plate, strip or carriage slide 52 on which the carriage slides. The slide is wider than the support. The foot of the carriage 4 extends outwardly around the slide 52. Carriage gibs 53 underlying the under edges of the slide are bolted to the carriage 4 by screws 54. There are also horizontal screws 55 to give horizontal adjustment.

Preferably the strength of the coiled spring 19 is so proportioned that when the splitting resistance of the slate drops to a lower point after the split is started, the splitting can be carried on by the strength of the spring alone. This condition will occur frequently. It will be seen that it is desirable to have the strength of the spring adjustable. For this purpose I provide an adjustment of the abutment 20 on its studs 21 by means of nuts. This feature of permitting the advancement to have only limited pressure after the split has been started is of great practical importance in all splitting machines made according to my invention. In this way the pressure on the slate will be only that of the compression spring 19 unless the slate offers greater resistance than can be offset by the pressure of the resilient means.

I will now describe the action of the chisel starting a split. Assuming that the regulating slide 22 is set at a level above its lowermost position according to the intensity of blow desired, the roller 10 on the shank 9 clears the path of the corners 15 of the hammer disc. When fluid pressure is applied to the motor 16 and to the piston 14 in the reciprocating cylinder 5, the carriage 4 will move into contact with the slate, pushing the chisel, shank and roller to the right until the inclined surfaces contact. At this point a corner 15 of the hammer disc will hit the roller and throw the shank and chisel against the slate. This is assisted by the pressure of the cylinder 5. When the slate is split slightly the chisel advances a little into the split. Of course, the carriage advances simultaneously which brings the chisel back into a position where the hammer disc delivers another blow. This cycle keeps up as many times as necessary. If no split results from the first blow the chisel rebounds thrusting the roller 10 back into the path of the corners 15 more quickly than if a split had started and a second blow occurs at once. This rapid movement will continue until either the stone splits or crumbles or the operator reverses the action. It should be noted that because the amount of play between the shank and the slide exceeds the distance the hammer will advance the chisel into the slate by one blow, the energy imparted to the chisel by the hammer is all absorbed by work on the slate and not by impact against the parts of the machine. If there is no slate block or slab in the machine then the coiled spring 19 on the shank will pull the roller out of the path of the corners 15 of the hammer disc and no blows will be struck.

Owing to the fact that the fluid pressure against the slate is controlled and is never more than required to continue the splitting operation, the pressure is limited to the setting of the machine. Actually the pressure on the chisel cannot exceed the mathematical product of the area of the piston 14 multiplied by the pressure in the cylinder.

As already mentioned, experience with this type of hammer and chisel shows that it is possible to have a rate of 25,000 to 30,000 blows struck a minute. This number of blows is given when the movement of the chisel is very short, for instance at the beginning of a splitting operation. At such a time where the movement is very short the chisel can rebound and the roller 10 will be in the path of the hammer disc 12 again so rapidly that the corner 15 following the one which originally hit the chisel—or at least one very closely following it—will catch the roller again and drive the chisel forward immediately. This obtaining of a blow from each successive corner does not continue indefinitely because as the length of movement of the chisel per blow increases with the splitting the interval between successive blows increases. This works out in a very satisfactory manner because, while on the one hand the force required to advance the chisel into the slate is very much greater at the beginning of the split than after the split has started, the initial force required decreases when the rate of the blows increases. It will be seen that with this arrangement the factors counterbalance themselves. It will also be observed that without a controlled drive this balancing would be impossible.

*Fluid drive means*

The fluid drive means of my machine is the key to my invention. While I prefer to use an incompressible liquid, many of the advantages can be obtained by using compressible fluids such as gases or steam. In the embodiment being described I use lubricating oil under adjustable pressure.

The fluid under pressure is supplied to the machine and taken away by means of three pipe lines which are shown more especially in Figs. 2, 6, 7 and 9. They consist of a shop pressure line 56, a return line 57 and a drain line 58 through which miscellaneous drains are collected and returned. With a view to being able to disconnect a machine from these shop lines, move it to a new location and reconnect with little loss of fluid, I provide the three lines with branches at selected points. These branches are fitted with unions 59 and a valve on each side of the union. Thus there is a valve on the machine side of each union and another on the shop side. The valves on the shop pressure line are numbered 60 and 61, those on the return line 62 and 63, and those on the drain line 64 and 65. The even numbers designate the valve on the machine side and odd numbers the valve on the shop side. It will be seen that by closing the valves and disconnecting the unions, a machine may be moved to another location in the shop and connected to another set of unions. The valves at the new location can be opened when one is ready to start operations. Such changes of machines may be required by the varying products that may be manufactured on them.

There are three quite independent elements in my machine which require power. They are the rotating hammer disc, the reciprocating carriage on which the chisel and hammer disc are moved toward and from the slate, and the clamps which hold the slate during the splitting operation. In the machine of the Lake patent above-mentioned, a flat belt was used as the source of power. This did not have the necessary controls, range of speeds or adjustability, even though the parts were complex. As stated at the opening of the specification, a belt drive had disadvantages which could not be overcome and it lacked completely certain abilities of inestimable value in dealing with slate.

First I will describe the mechanism that drives the hammer disc 12. A short distance from the shop pressure line 56 and the valve 60 on a pipe line 66 is a hammer flow control valve 67 by which the speed of the hammer motor 16 is controlled. This valve may be any commercial valve which is so arranged that it passes a definite quantity of fluid in a given time. It is set by a handle on a dial face. It also has a compensating device for changes in pressure so that such changes produce only negligible changes in the quantity of fluid passed. Because the motor 16 reciprocates on carriage 4, this valve 67 is connected to the motor 16 through fittings 68 on the rear stiffener plate 136 of the frame of the machine to flexible hose 69 connected to the motor (see Fig. 7). The motor may be either a gear or piston type. (An electric motor or a pneumatic motor may be used here without departing from the principles of operation.) In both these types the speed at which the motor runs depends upon the quantity of fluid that is passed through it. After the fluid has passed through the motor 16 it is returned through the return line 70 to the shop return line 57. I prefer to place in this line 70 a check valve 195 which permits fluid to flow from the motor 16 but not back to it. This sets up a back fluid pressure which some motors of these types require for satisfactory operation. It also assures that the pipe lines and motor, once filled with fluid, will not become dry or empty, and further that under no conditions can the fluid flow backwards and reverse the motor. The drain pipe line 71 to the shop drain line 58 is included in the machine when there is any likelihood of a slight leakage in the motor into the interior parts of the motor.

Unless this hammer flow control valve 67 is set at zero when the valves 60 and 61 on the pressure line are opened, the hammer motor 16 will start to run.

Figure 2:
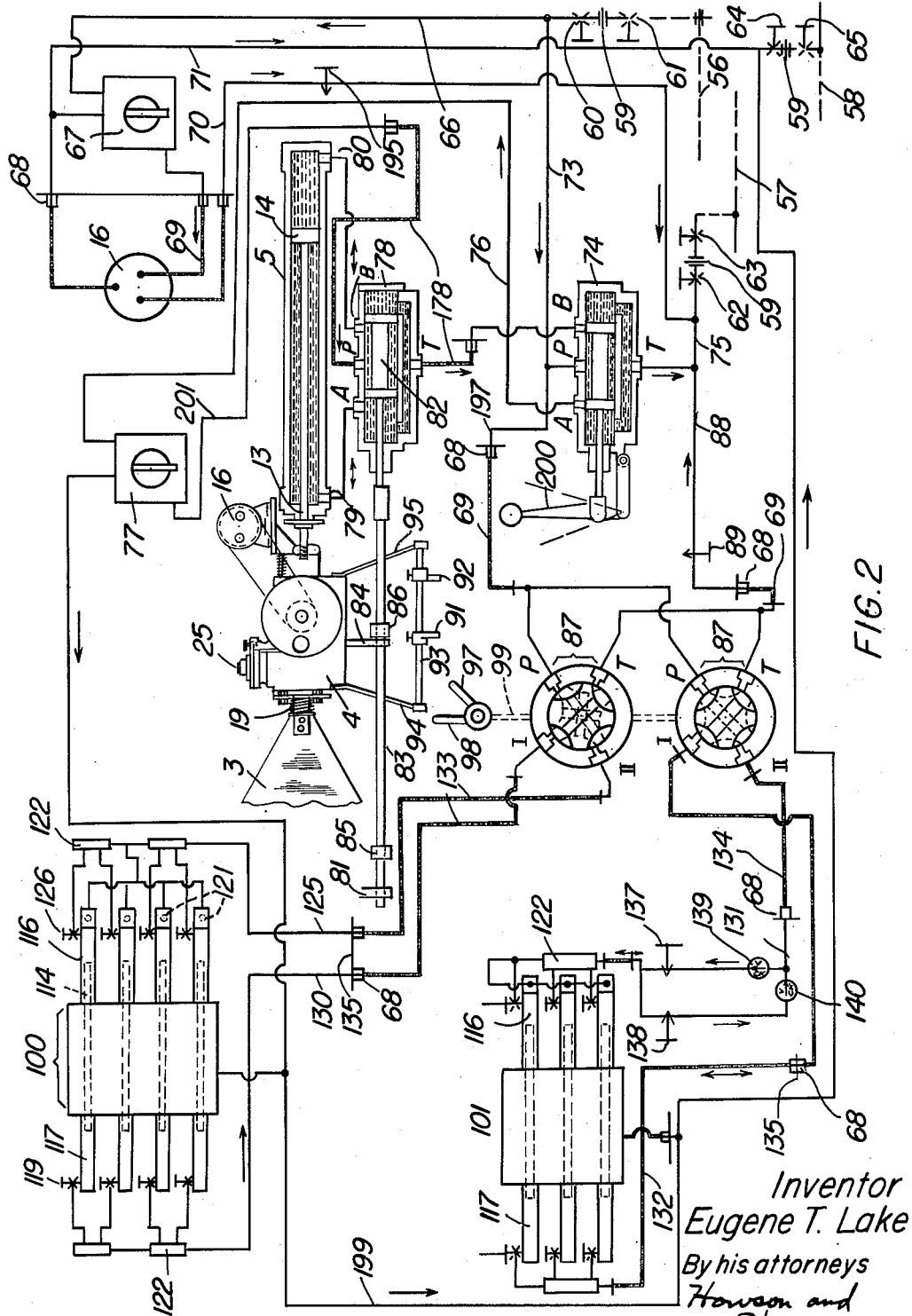
Fig. 2 is a hydraulic diagram showing the operation and controls of the hydraulic power of a center line slate splitter made according to my invention; the view showing the general relation of the parts just as the carriage has started its movement forward toward the slate, but not the relative positions of the parts.

I will now describe the hydraulic connections relating to the reciprocation of the piston in the cylinder 5. The function of this cylinder is to cause reciprocation of the hammer and chisel toward and from the slate. There is a branch line 73 from the pressure pipe line 66 to a main starting valve 74. This starting valve 74 is manually controlled by the operator of the machine and has three positions: start, stop and reverse. When the starting valve handle 200 is in its vertical or stop position, as shown in Fig. 2, no fluid can flow through the valve and everything to which the valve is connected is hydraulically locked against movement. It will be seen that the valve contains a spool-shaped slide and that in the "stop" position one disc of the spool closes port marked A and the other closes port marked B. In between these two ports is one marked P which is the point of connection of the branch pipe line 73 from the shop pressure line.

When the operating handle 200 is moved to the "start" position the slide moves so as to connect the port A to the pressure line 73 and the port B to a return line port marked T. This return line port T is connected by a machine return line 75 to the shop return line 57. The port A of the starting valve 74 is connected by means of a pipe line 76 to a flow control valve 77 for the reciprocation cylinder. This flow control valve 77 is in turn connected by a flexible lead 178 to the pressure port P of a reciprocating valve 78.

The reciprocation valve 78 is constructed in much the same manner as the starting valve 74 except that it is automatically controllable. A return port T of the reciprocation valve 78 is connected to the port B of the starting valve 74 by a flexible lead 178 and line 201. The port A of the reciprocation valve 78 is connected to the piston return port 79 of the reciprocation cylinder 5. It will be seen that because the pressure port 80 of the cylinder 5 is connected to the port B in the reciprocation valve, the piston 14 in the cylinder 5 will be driven outwardly toward the slate whenever the slide in the reciprocation valve connects the port B to the pressure port P. On the other hand, if the pressure port P of the reciprocation valve is connected to the port A, the piston and piston rod will be returned into the cylinder and the carriage retracted from the slate.

I will now describe the manual operation of the piston rod 13 in the cylinder 5. With the starting valve 74 in "start" position and the reciprocating valve in position for driving the piston 14 and piston rod 13 outwardly as shown in Fig. 2, the liquid from the shop pressure line 56 flows into the port P of the starting valve, out of the port A, through the pipe line 76 to the reciprocating flow control valve 77, to the pressure port P of the reciprocating valve 78, out of the port B to the driving port 80 of cylinder 5. This applies pressure to the face of the piston, pushing it to the left in Fig. 2. The fluid on the other side of the piston escapes through the return port 79 of cylinder 5 into the port A of the reciprocating valve 78, out through the port T into the port B of the starting valve 74, out through the port T and into the machine return line 75 to the shop return line 57.

If the handle of the starting valve is at "stop" the ports A and B of that valve are closed and no fluid can flow through the valve or the cylinder circuit in either direction. Therefore the piston 14 in the cylinder 5 is hydraulically locked against movement. If the operating handle 200 is pushed to the "reverse" position the port B in this starting valve 74 is opened to the pressure of port P and port A is connected to the return line. The result in this case is that the flow is completely reversed in the reciprocation cylinder circuit. The piston 14 will reverse its movement and the carriage will retract from the slate. It will be seen that the operator has a manual control which enables him to reverse the carriage from either direction of movement as desired. However, the machine can operate itself automatically when the starting valve 74 has been put in "start" position.

I will now describe the mechanism by which the carriage is reciprocated automatically. The flow control valve 77 for the carriage 4 regulates the amount of flow to the cylinder and therefore the maximum speed of movement. The spool-shaped slide 82 in the reciprocating valve 78 has a valve rod 83 connected to it. This valve rod 83 slides freely at its far end in a support 84 attached to the end of the carriage slide support 51. The rod is parallel to the piston rod 13 in the reciprocation cylinder 5. At a point intermediate the ends of the valve rod 83 it passes through a reversing finger 84 attached to the carriage 4 (see Fig. 2). This finger 84 is firmly attached to the carriage but embraces the valve rod 83 loosely so that it can slide upon the rod. Adjustably fixed on the valve rod are two collars 85, 86 adapted to be engaged by the finger 84 alternately as the carriage moves back and forth. The collars 85, 86 are so positioned on the valve rod 83 as to cause reversal of the position of the piston reciprocating valve 78 when the carriage is near either end of its stroke. As shown in Fig. 2, where the carriage is moving to the right, when the finger 84 contacts the collar 86 on the valve rod the carriage is almost at the inner end of its stroke and the valve rod will be moved to the right. This reverses the port connections of the reciprocation cylinder 5 so that the port 80 becomes the inlet and 79 becomes the outlet. Thereupon the piston 14 in the cylinder 5 will move to the left. When the carriage 4 approaches the left end of its movement the finger 84 will engage the collar 85 on the valve rod and the latter will be moved to the left, which again reverses the movement of the carriage. These alternate movements will continue as long as power is supplied.

It should be noted that with this arrangement the maximum pressure that can come upon the edge of the chisel and slate is determined by the area of the piston multiplied by the pressure of the fluid in the cylinder. Because of the high speed of the impulses imparted to the chisel in this machine the pressure required for starting the splitting can always be kept low enough to be less than the pressure which is safe to apply to the chisel or the slate. This is true even with the slenderest chisel or the thinnest slate that it would be desired to split. If required, the range of usable pressure can be extended by a reducing valve placed in the lines to the flow control valve 67 or 77 to lower the pressure or a booster valve can be used to increase it.

The reciprocation flow control valve 77 regulates the amount of fluid that can flow to the reciprocation cylinder 5 and therefore the valve determines the sped at which the piston is moved. The effective area of the piston 14 on the right hand side as it is shown in Fig. 2 is greater than it is on the left because the left side is reduced by the cross-sectional area of the piston rod 13. Therefore it takes more fluid to move the piston a given distance to the left than it does to move it to the right. Because the volume of fluid delivered through the reciprocation flow control valve 77 is constant for a given setting of the valve, the piston will move faster to the right than it will to the left. Since the movement to the right is the withdrawing movement, in this way we derive a quick return hydraulically. The larger the piston rod 13, the quicker the return will be.

With the arrangement above described, in case of a jam the machine simply stalls until the operator either stops or reverses it. As the load can never become excessive, there is less breakage and wear than on slate splitting machines heretofore known. For the same reason the maintenance of my machine is easier.

It is essential when splitting thin slabs of slate that the chisel attack the edge of the slab at or near the middle of that edge. If this is not done the split will frequently run off to one side and the resulting sheets will be of uneven thickness. In a long slab of slate there is also the possibility that the split would run out to one surface before reaching the end, thereby giving two useless sheets of slate. It is to avoid these results that the machine is equipped with two sets of centering and clamping devices, one at each end of the slab to be split. These means cause the slab to be centralized at both ends about the plane of action of the chisel.

The third principal element in my machine which is fluid-controlled is these means for clamping the slate in position to hold it while it is being split. I provide two sets of clamps, one at the forward end of the slate, known as the main clamp 100, and the other at the rear end and known as the front or abutment clamp 101. My clamping means, while fluid-driven, are controlled by the position of the reciprocating carriage 4 as far as concerns opening and closing of the clamps. Each of the two sets of clamps comprises a plurality of pairs of opposed arms 102 or 103 adapted to swing between open and closed position. Each arm is bent in the form of a V, one end being adapted to contact and hold slate while the other end is the pivot point. At the pivot point each arm is mounted on a vertical shaft. I have found that the front clamp set need have but three pairs of arms, each arm fitted with two discs as in the case of the main clamp set. Clamp 100 and clamp 101 are each assembled as a unit which can be slid into position on the frame.

Figure 11:
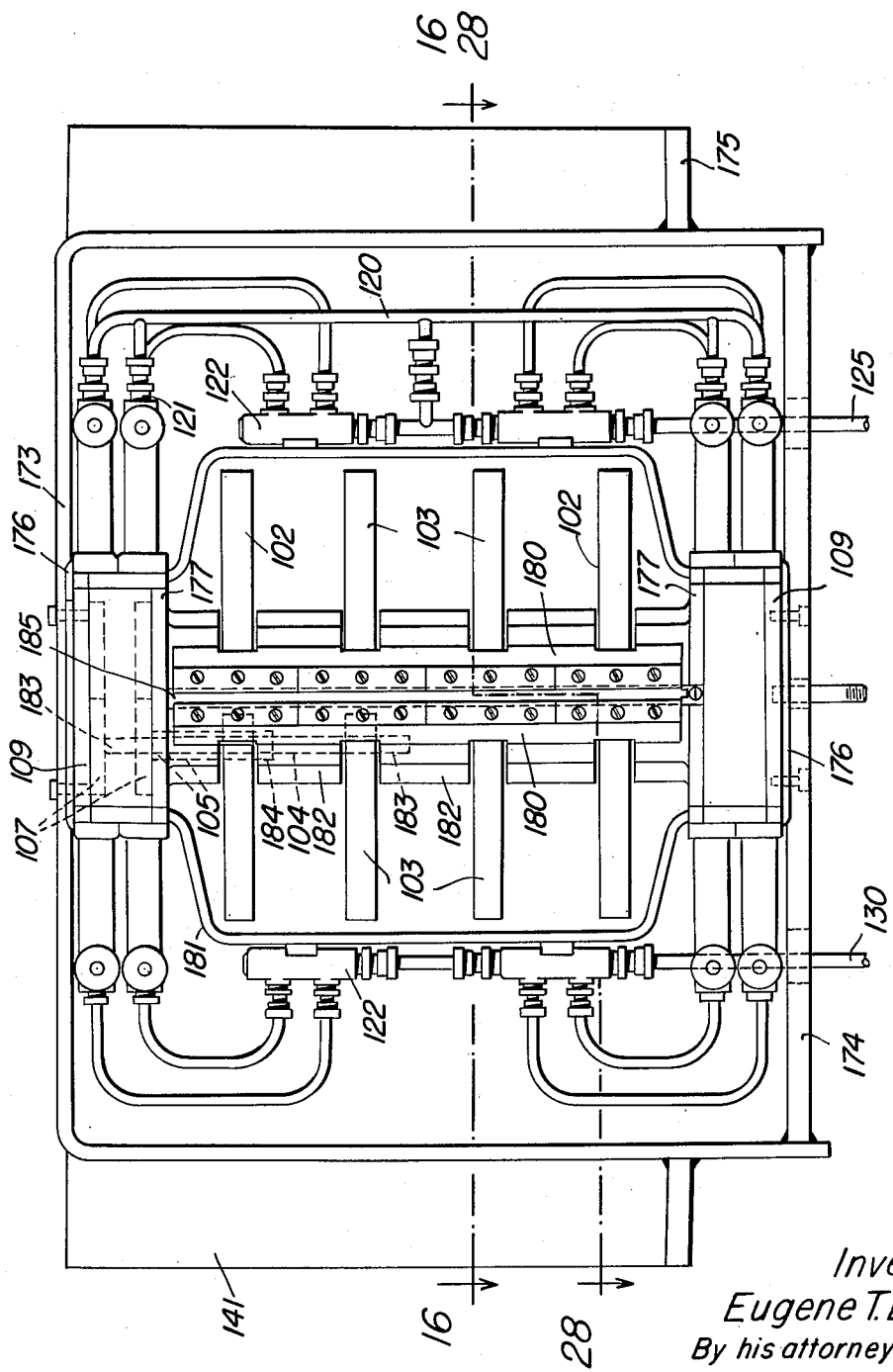
Fig. 11 is a view on an enlarged scale of the main clamp and associated parts.

I will describe the main and front clamps separately. A rear view of the main clamp in elevation as assembled, ready to be put into the rest of the machine, is shown in Fig. 11. The frame of the main clamp is identified in the drawings by the reference character 173 and is a flat bar shaped like a U so as to form the top and sides. Across the bottom of the U, a sole piece 174 is welded to the legs of the frame 173. On the outer side of each leg a short distance above the bottom is an outwardly extending lug 175 for bolting the whole main clamp frame to the top of the frame 168 of the machine. The main clamp also has a vertical face plate 141 welded to the front of the frame and the sides of the face plate are curved toward the rear as can be seen in the plan view Fig. 6. The face plate faces away from the hammer carriage 4 and toward the front of the machine which is to the left in Fig. 1. There is an aperture 185 in the face plate to permit passage of the chisel (Figs. 11 and 28).

As can be seen from Figs. 11 and 16, there are four pairs of clamping arms, one above the other, in the main clamp set. Each pair of arms is driven by a separate set of driving equipment. I place two sets of this driving equipment above all four pairs of arms, and the other two sets below the arms. The clamping arms 102, 103 are each pinned to a vertical shaft by a tapered pin 106 (see Fig. 28). On each of these shafts is a clamp gear 107, the gears on the two shafts for a pair of opposed arms being meshed with each other. In the main clamp set there are clamp or driving gears 107 at the top and bottom, as can be seen in Fig. 11. The gears at the top and bottom are in housings. Each gear housing of the main clamp consists of three parts: a cover 176, casing 109 and a base 177 (see Fig. 11). On each base 177 are secured two vertical supporting columns 180 connecting the two gear housings. The casings 109 are drilled and tapped on the sides to secure supports 181 for manifolds hereinafter referred to.

In the bottom casing 109 are two pairs of gears, one above the other, and in the top casing are the other two pairs of gears, one above the other. In view of the fact that one gear is mounted directly above another, and one clamp arm directly above another, the shafts connecting the inner gears to their corresponding arms must be hollow and the shafts for the outer gears pass through them. The hollow shafts are designated by the reference character 105 and the solid shafts which pass through them by the number 104 (see Fig. 32). A single pair of such shafts is also shown in dotted lines in Fig. 11. The upper gear 107 on the left has a solid shaft 104 which passed freely through the second or lower gear 107 and the top arm 102 and is keyed to the second arm from the top which is marked 103. The second gear from the top drives a hollow shaft 105 which surrounds the solid shaft from the second gear to a point below the top arm 102. The hollow shaft is keyed to the top arm. The top and bottom arms are numbered 102 and the two middle arms which are mounted on the solid shafts are numbered 103. The solid shafts have bearings 183 in the casings 109 and in the vertical supporting columns 180 where they are covered by bearing caps 182 (see Figs. 11 and 32). Similarly the hollow shafts have bearings at 184. The arrangement of the lever arms and gears in the lower half of the main clamp is just an inversion of the top.

Lying parallel to the plane of each pair of gears is a toothed rack 108 (see Fig. 16). This operates the arms. There are teeth on this rack opposite the gear for the left arm, as shown in Fig. 16, but no teeth opposite the right gear. Lateral movement of the rack will turn the two gears in opposite directions and either retract the two arms or bring them together, according to the direction of movement of the rack. For example, in Fig. 16 when this rack 108 moves to the left the two arms come to closed position and when it moves to the right they open. This toothed rack slides in the clamp gear casing 109. Abutting each end of each rack is a ram 114 to move the rack. The ram on the right of the rack as viewed in Fig. 16 slides in a casing 116 which I will term the "closing" casing and the ram at the other end in a casing 117 which I will term the "opening" casing. There is a packing ring 196 to maintain tightness around each ram in its casing. I term the casing 116 on the right the "closing" casing because when that ram is projected from that casing the effect is to bring the two pairs of arms 102, 103 together; while I call the casing 117 on the left the "opening" casing because its effect when it projects its ram 114 is to cause the arms to open. At the end of each casing away from the rack is a washer which is a cushioning seat 115 for the ram. These seats 115 are perforated at the center and on the end of each ram facing the seat is a tapered point 198. The tapered point and opening in the seat are of such relative dimensions that as the ram approaches the seat it gradually cuts down the flow of liquid from the casing through the seat, causing a gradual stopping of the ram or a cushioning effect. Beyond each seat in ram casing 117 is the chamber of a shutoff valve 118. At right angles to the ram cushioning seat 115 is the seat of this shutoff valve. This seat also is perforated to permit the fluid to flow through it when the valve is not shut. I provide a valve stem 119 which can be screwed down against the shutoff valve seat if and when desired. This stem 119 can be shut down to any desired extent. A shutoff valve such as is described is provided only at the end of the so-called opening ram casing 117.

There is a valve of slightly different construction at the end of the closing ram casing 116. The reason for this difference is as follows. It will be noted that when the ram 114 is retracting into its casing 116 the clamping arms are being opened. At this time, of course, the fluid in that casing 116 is flowing out into the piping. It is desirable that the clamp arms be retracted as quickly as possible and I govern this by the rapidity of the discharge of the fluid from the casing 116. I provide means which automatically provide an extra discharge path for the fluid from the casing which is not used when the fluid is coming into the casing. To this end I provide a check valve 121 beyond the chamber of a regulating valve 123 which takes the place of shutoff valve 118. This check valve is connected to a pipe 120 which leads to a manifold 122 into which the liquid can be discharged. The check valve prevents fluid entering the casing from the pipe 120. When fluid pressure is applied to push the rack 108 to the left and close the clamping arms, the fluid flows into the chamber of the regulating valve 123 which is used in place of the shutoff valve 118. This regulating valve is located between the ram cushioning seat 115 and the check valve 121. It is connected by an elbow fitting 124 and a pipe going to the above-mentioned manifold 122 and thence to a main clamp closing line 125. The stem 126 of the regulating valve has a tapered end which as screwed down moves into an orifice plate or seat 127 so as to gradually restrict the area through the orifice. In this way the quantity of fluid that can enter the casing in a given time can be closely regulated. As a result the speed with which the ram 114 can be pushed to the left in the casing 116 can be varied to suit the requirements. For instance, if it is desired that the lowest pair of arms should start to close before one of the upper pairs, the stems 126 of the regulating valves for the upper pairs of arms should be turned in progressively so as to delay the upper arms. The result is that while all the valves in the main clamp set will start to close at the same time as set by the tappet 91, the lowest pair of arms may be set so that they will finish closing first and the others later, according to the settings of the stems 126 of the regulating valves. Obviously, each may be set independently of the others. The valve stems 119, 126 may be threaded through glands 128 which are set on the chambers of the valves. The valve stems may be locked in place with lock nuts 129. I have found that any slowing down of the closing will have but slight effect on the speed of opening of the arm.

It is possible with the mechanism that I have described to take one or more pairs of clamping arms out of service when desired. Thus, any pair of clamping arms may be immobilized in their open position by screwing down the shutoff valve stem 119 for that pair while the arms are open until the flat face on the end of the stem covers the hole in the valve seat. Then when pressure is applied to the casing 116 the rams 114 cannot move because the fluid in the casing 117 cannot escape. Therefore the corresponding clamp arms 102 or 103 cannot close. The desirability of shutting off some of the arms may arise when splitting very narrow slates.

The front clamp 101 differs from the main clamp 100. The frame of the front clamp comprises an inverted U-shaped flat bar 112 and a sole plate 113 completing the square and lying across the machine at right angles to the direction of the chisel. There is a face plate 142 welded to this frame with the ends curved toward the front of the machine, i. e., away from the "slate space," thus helping to form the entrance to that slate space. The space on top of the table top 2 between the face plates of the two sets of clamps is called the "slate space." I also provide a removable cover 186 on the front side of the machine to prevent the clothing of the operator becoming entangled in the mechanism.

Owing to the fact that in the front clamp 101 the chisel does not pass between the gears and the clamp arms, the gears and arms can be joined directly, as shown in Figs. 21 and 24, by short shafts 192 having bearings in front gear casings 193 and covers 194. The arms in this case are like the arms 103 of the main clamp in that they are secured to solid shafts.

The gear casings 193 for the front clamp are supported on flat bar supports 110 and 111 with bent ends for attachment at the top and bottom to frame 112 and sole piece 113. The gears 107, the toothed racks 108 and the rams 114 are arranged in the same general manner as in the case of the main clamp 100. The covers 194 enclose the gears 107, 108 and also carry the upper bearings of the front clamp shafts 192. The other bearing for these shafts is in the front casing 193. The manifold supports 181 are secured to the top and bottom casings 193.

As shown in Fig. 24, there is a slot 188 in the table top running lengthwise of the machine in the middle. To run in this slot is a guide 189 welded to the underside of the sole plate 113. This guide holds the assembled front clamp in the center of the machine and at right angles thereto as it is slid to and from the main clamp 100 in adjusting for various lengths of slate. To raise the underside of the sole plate 113 slightly above the table top 2 I weld a thin plate 187 underneath the sole plate at each end as a rubbing piece.

Near each end of the sole piece 113 is a row of holes 190 which can be seen in Figs. 21 and 24. There is a corresponding set of holes 191 (Fig. 6) in the table top, though there are more holes in each row in the table top than in the sole piece of the front clamp. By bolting the holes 190 in the sole piece of the clamp frame to the bolt holes 191 in the table top the front clamp 101 can be secured in various positions for the various lengths of slate to be manufactured. For example, I prefer to space the bolt holes 191 in the table top one inch center to center. This enables me to vary the position of the clamps by one inch at a time. Finished shingles or slates may have various kinds of edges, thus being produced by a trimming or dressing operation subsequent to the splitting. For this reason the slates at the splitting operation need to be longer than the finished slate. If the allowance for trimming is a half inch at each end or a total of one inch, the abutment clamp can merely be set back one inch more than the length of slate desired. If the allowance is say ⅜" of a total of ¾", this could be arranged for by the spacing of additional holes in the sole plate 113. This enables me to set the front clamp to any length of slate corresponding to even inches, by using the first and third bolt holes in the sole plate. By providing that a second hole is set before the third hole by an amount equal to the total allowance for the dressing and a fourth hole is spaced from the second hole by a dimension equal to a multiple of the spacing of the holes 191 in the top plate 2, the front clamp can be placed in all positions also required for the range of slates having such allowances.

I have also found that the so-called "planes of cleavage" in slate are not always true planes, but may be slightly curved. If the planes of cleavage are not true and the slab is being held rigidly at its back or abutment end, a bending stress may be set up in the slate as the chisel advances, with the result that the slate sometimes breaks. To avoid this condition I provide a series of rollers 90 retained on the center line of the face plate 142 by retainers 151. When the pressure from the clamp discs 143 is removed from the sides of the slabs being split, the end of the slab can wobble on these rollers as the slate tries to make its cleavage conform to the chisel. It will be noted that while the hand splinter tries to make the chisel conform to the cleavage, I provide means by which the slate cleavage can tend to conform to the chisel. This effect is of importance when splitting very thin slate. In such a case the slate sheets are lighter than the chisel and if free to move from side to side the sheets will do so with but little strain.

The fluid pressure for the clamps is obtained from the three shop pipe lines 56, 57, 58. The branch pipe line 73 from the shop pressure line 56 to the starting valve 74 has an extension 197 to a double, rotary, four-way clamp control valve 87. Similarly, after the fluid has passed through the clamping system it is returned to the shop return line 57 by an extension 88 of the machine return line 75. In this clamping return line 88 I provide a check valve 89 to prevent the oil running out of the clamping system and to be sure that the clamp will not be worked by any other pressure than that which comes through the clamp control valve 87. This check valve also provides a slight back pressure to the clamping system which prevents varying pressures in the return line affecting the holding power of the clamps. This holding power then is determined by the difference of the back pressure and the pressure in the pressure line. This clamp control valve preferably is a double one, involving duplicate parts, one for the set of clamps at one end of the slate slab which constitutes the main clamp 100 and the other for the set of clamps which constitute the front clamp 101. I use a double valve for this clamp control valve merely to be sure of having sufficient capacity. If desired, a single large valve may be used dividing the circuits from the ports I and II so that a branch of each goes to each set of clamps. The valve portion for each clamp comprises four ports: a pressure port indicated by the letter P, a return port indicated by the letter T, and ports numbered I and II. The valve core is four-sided and each side is connected by a separate passage to the opposite side.

The connections from the clamp control valve 87 to the ram casings are as follows. There is a connection from the port numbered II to the ram casing 116 for each of the pairs of arms in each clamp (see Fig. 2). In the case of the main clamp 100 this comprises a main clamp flexible hose 133 connected to the port II of the main clamp and extending down to the middle stiffener plate 135 of the frame of the machine. At this point through another fitting 68 the flexible hose is connected to a stationary main clamp closing line 125 which carries the fluid up to the manifolds 122 associated with the ram casings 116 (see Figs. 2 and 11). I provide a manifold for each pair of arms on the side where the ram casing 116 is located and similar manifolds on the side where the ram casing 117 is located. The return line from the latter set of manifolds of the main clamp is identified in the drawings by the reference character 130 which, going through a fitting 68 and another flexible hose 133, is connected to the port I of the clamp control valve 87. When the valve is in the position 1 shown in Fig. 18, the port I is connected to the port T which leads to the clamp return line 88 (Fig. 2). The port II is connected to the branch pressure line 73 and the shop pressure line 56. The connections from the port T to the return line and the port P to the pressure line both involve flexible hose fastened to the rear stiffener plate 136 of the frame of the machine by the usual fittings 68.

The connections to the front clamp are similar to those for the main clamp. To the port II of the clamp control valve 87 is connected a front clamp flexible hose 134 terminating in the usual fitting 68 in the middle stiffener plate 135 (Figs. 2, 6 and 7). At this point the fluid is picked up by a front clamp closing line 131 which, with the help of another short flexible hose connection, carries the fluid to the manifolds 122. This front clamp closing line 131 is split into two parallel lines for a short distance for the following purpose (Figs. 2 and 23). In one line the flow is permitted toward the manifold and in the other line from the manifold. In the line where flow is permitted toward the manifold there is a needle regulating valve 137 and a check valve 139 which permits flow only toward the manifold. In the other branch of the line there is another needle valve 138 and a check valve 140 which permits flow only from the manifold toward the clamp control valve 87. By partially closing the needle regulating valve 138 in the return branch the opening of the front set of clamps can be delayed. Similarly, by partially closing 137 the closing of the front clamp can be delayed. The delays are with relation to the time of the same operation of the main clamp.

The arrangements of the piping and valves for the front clamp 101 can be seen not only in Fig. 2 but also in Figs. 22 and 23. The return or opening line 132 from the front clamping set to the port I of the clamp control valve 87 consists of a flexible hose with the usual connections going to the middle stiffener plate 135 of the frame. I provide a drain line 199 from the reciprocation flow control valve 77 and also the gear casings in both the main and front clamping sets back to the shop drain line 58.

When the clamp control valve 87 is in position 1 shown in Fig. 2, the pressure flows from the ports II along the main clamp closing line 125 and the front clamp closing line 131 to the ram casings 116, thereby pushing the rams to the left as shown in the drawings, which in turn push the racks 108 in the same direction. This turns the left hand gear wheels 107 and the associated gear wheels in such directions as to cause the clamps to close. The arms swing outwardly through the face plates 141, 142 of the main and front clamps and then toward the center line with equal angular motion but in opposite directions. As shown in Fig. 28, there is a pair of clamp discs 143 pivotally mounted on the end of each clamp arm. These discs must be equally spaced about the center line of the machine with relation to its plate on the opposite side. Any slabs of slate placed between the discs 143 will be forced to place its median plane on the central plane of the machine, which is the line of action of the chisel. This point is normally midway between the opposed clamp arms and discs. This median point of the slate is also located midway between the two discs on an arm. If one of the discs of a pair strikes upon a lump on the surface of the slate and the other upon a normal surface, the midpoint of those two particular discs will be half the height of the lump from the true surface. The pair on the other side of the slab will probably have a mean at the true position. In this case this particular pair of arms would tend to place the slab one quarter of the height of the lump from its true position. However, if three of the four pairs of clamp arms in the main clamp tend to place the slab in a certain position and the fourth in another position, the three will naturally dominate and either the fourth will be forced to open a trifle or the slate will bend a little. If this bending is too great the slate will break. This result will occur occasionally if a non-slaty substance is embedded in the slate or if there is too great a curvature in the cleavage plane. In either case that particular slate is probably unfit for the intended purpose and its fracture can be considered as a rough method of eliminating it from wasting more labor upon it.

As the motive force of the clamps is fluid under pressure and that pressure cannott rise higher than the pressure in the mains, when the clamps close upon a slab of slate, whatever its thickness, the clamps will stop at that point but maintain a pressure upon the slab, holding it in position until the pressure is released by action of the clamp control valve 87.

Further with regard to the manner of mounting of the discs as shown in Fig. 17, it may be noted that these clamp discs 143 have stems on them so that they are in the shape of a half spool. These stems are retained in carriers 144 by spring-retaining rings 145 snapped into grooves on the stem. Each disc carrier 144 is pivotally mounted on its arm by means of a pivot pin 146 which is held in place by two of the spring-retaining rings 145, one at each end of the pivot. In the end of each clamp arm is a recess in which spring casing 147 containing a spring 148 is located. The spring 148 pushes the casing 147 against an adjacent flat of the disc carrier 144 with sufficient force to hold the axes of the disc normally vertically to the arm, as shown in Fig. 17.

The points during the strokes of the chisel at which the clamps close and open are primarily governed by certain adjustable tappets 91 and 92 moving with the reciprocating carriage 4. I also provide devices in the piping for the clamps at the front clamp which make it possible to adjust the operation of the clamp at that end so that it is a little behind the opening of the main clamp.

The adjustable tappets 91, 92 are carried on a rod 93 lying parallel to the reciprocation carriage 4. This rod 93 is mounted on two arms 94, 95 fixed on the carriage 4 so that the rod and tappets both move with the carriage. These tappets can be seen in Figs. 2, 18 and 20, and it will be observed from Fig. 20, which is an end view of the rod 93, that the tappets 91, 92 depend from the rod in different vertical planes. Mounted just below the two tappets is a collar 96 having two arms 97, 98 thereon, the arm 97 lying in the plane of the tappet 91 and the arm 98 lying in the plane of the tappet 92. This collar 96 is mounted on the end of the spindle 99 of the clamp control valve 87. The spindle is also the core of the valve. As can be seen from the drawings, the two arms 97, 98 project from the spindle about 45° apart. When one of these arms pivots vertically upward it lies in the path of its tappet. When the tappet attempts to pass the collar while the upper arm is vertical, it will rotate the collar until the spindle has turned about 45°, when the end of the arm is lowered sufficiently to allow the tappet to pass. This turning brings the other arm up into the path of its tappet. Each tappet can work only on its corresponding arm and can push it in only one direction. Furthermore, it must wait until the other tappet has pushed its arm into place before it can act on its own arm. I designate the position of the valve in Fig. 18 as position 1 and the position of the valve in Fig. 19 as position 2. It will be seen that Figs. 18 and 20 correspond and relate to position 1. In this position the carriage is at the right of its movement as it is shown in Fig. 2, i. e., the carriage is fully retracted and is about to move outward or forward. The positions of the tappets 91, 92 are such that the tappet 91 acts on its arm 97 just before the carriage is fully retracted and the tappet 92 is so spaced from it that it does not contact its arm 98 until just before the carriage reaches the end of its outward or forward movement. The distance that the tappet 91 must move past the vertical center line of the spindle 99 of the valve corresponds to the dimension marked B in Fig. 18. This dimension must always be sufficient to cause movement of the valve. Thus if the required travel of the tappet is say one inch it can never be placed closer than one inch from the position that would cause reversal. Similarly I have marked with the letter A the distance which the carriage must move to the left, i. e., forward, from its extreme right hand or retracted position before the tappet 92 should contact the arm 98 on the collar 96. Further movement of the rod 93 will carry the tappet 92 far enough to push the arm 95 into position 2, i. e., that shown in Fig. 19. Any further forward motion of the carriage will have no effect on the fluid circuits controlling the clamps and the clamps will remain open until the returning carriage brings the tappet 91 back into contact with its arm 97.

*Overtravel*

To time the operations of the machine properly, I find it advisable to provide a movement which I call overtravel. To provide time for the operator to place the slate in position and time to enable the proper operation of the clamps, I make the stroke of the carriage and the attached chisel 3 considerably longer than the distance between the face plates 141 of the main clamp and 142 of the front clamp. As already mentioned, the space between these two face plates is called the slate space in this specification. If the slate space is say 24″, I prefer to make the total stroke about 30″. The additional 6″ are taken up by causing the chisel to retract some 6″ within the main face plate 141 before beginning its forward or splitting stroke. Thus if on the forward stroke the edge of the chisel should be advanced to the abutment on the front clamp set, on the return stroke the edge of the chisel would be withdrawn 6″ behind the face plate 141. This amount of withdrawal is referred to as overtravel. Ordinarily the chisel is not allowed to reach further forward than say 3″ from the clamping discs of the front clamping sets. This insures that the operator's fingers will not be caught between the edge of the blade and the abutment, as already mentioned. Also, guards can be provided but it is not necessary to describe them here.

Another reason for this overtravel is that as the blades of the chisel through use become shorter and shorter, the positions of the used stroke can be advanced by shifting the collars 85 and 86 to the left on reversing valve rod 83.

As already pointed out, it is during this overtravel that the operator swings the slab of slate into an approximate central position in the machine. By the time he has done this the carriage will have reached the end of the return stroke, the clamps will have begun to close, and by the time the chisel edge emerges through the chisel aperture 185 in the face plate 141 of the main clamps the slate slab will have been firmly clamped into position. By the time the chisel has advanced sufficiently to hold the slate erect the clamps will commence to open and will move away rapidly enough to permit the split slates to be laid on the table top 2 without interference from the clamping arms. It will be seen that between the time the chisel blade disappears through the opening in the face plate 141 and the clamping arms appear through the face plate, the operator has time to get the slab into position for the clamping arms to grab it for the splitting operation.

After the first split he uses this time to swing the half slab down on his left. He also holds the other half at the center by his right hand, and the machine centers this and splits it. One half is laid down to the left and the machine centers and splits the slab held at the center to make the third split. The third split will give two sheets of the right thickness if working "eighters." At this point then the left hand reaches for the piece split off on the previous split, the right hand reaches over the blade, grasping the two pieces of slate between the thumb and forefinger and lays the shingles down to the right as the blade is withdrawn through the face plate. The left hand then swings the "twoer" on the left up into place, etc. Another use for the overtravel is that it provides space for the removal of the chisel, replacing it by another when this becomes needful.

In case it is desired to remove the chisel, the machine is first stopped by putting the main starting valve handle 200 in vertical position. The adjustable collar 86 on the reversing valve rod is then moved to the right as far as possible and the reciprocating cylinder flow valve 77 is moved to slow speed. The auxiliary handle 160 for the starting valve 74 is then moved to the left and when the carriage has moved to the end of its travel this lever is put in the center and the carriage is thus stopped. This auxiliary handle 160 is connected to the regular handle 200 by a link 161 so that the two handles are always in the same position and the carriage movements can be controlled from either place. The chisel may then be removed and another substituted. After the chisel has been changed the carriage is run to the left sufficiently to permit the collar 86 to be replaced in its running position according to the length of the new chisel. The reciprocating cylinder flow valve 77 is then reset for the required speed and the starting valve 74 can be thrown to start position whenever the operator is ready. The reason for having the extra handle is that when the operator is removing the chisel blade he stands on the right of the machine or below it, as appears in Fig. 6. A chisel is cleaned in operation by cleaners 153 which are spring blades fastened on supporting columns 180 on the main clamp (see Fig. 28).

*Operation*

The shop line valves 60-65 should first be opened while the starting valve 74 is in "stop" position. This will start the hammer motor and the speed of the motor should then be regulated by adjustment of the dial on the hammer flow control valve 67. This valve setting will probably not be changed as long as the quality of the slate being split remains the same. The proper setting would be found for each variety of slate to give the best result, and it is then left at that setting. The cylinder flow control valve 77 should be set to give the desired speed of reciprocation of the carriage. This will depend chiefly upon the operator's skill in handling the slate blocks and taking the split product out of the machine. It is expected that the larger sizes will be handled more slowly than the smaller sizes. The machine's normal speed may for example be considered as twenty splitting strokes per minute. Of course, the speed is under the control of the operator, as well as the starting, stopping and reversing.

As shown in Fig. 6, there is a supply conveyor 149 on the left of the operator who in this figure will be standing at the left of the machine. The supply conveyor, of course, is at the top of the drawing. When the operator is ready to start operations he moves the handle of the starting valve 74 to "start" position. This will start the carriage reciprocating and the clamps opening and closing. When the machine is working satisfactorily the operator grasps a slab S on the supply conveyor at his left, slides it over onto the table 2. At the right moment, just before the chisel 3 disappears through the face plate 141 of the main clamp, the operator swings the slab up vertically about the edge nearest the center line of the machine until the slab is vertical. He then holds it there. Just before the chisel 3 reaches the end of its retracting movement the tappet 91 on the carriage 4 contacts the arm 98 of the collar 96 and turns the spindle 99 of the clamp control valve 87 to position 1 shown in Fig. 2. This arranges the ports in such a manner that fluid under pressure flows to the clamps and causes them to close on each end of the slate slab. This forces the slate to a central location in the machine.

At this moment the finger 84 on the carriage contacts the forward collar 86 and pushes the valve rod 83 of the reciprocation valve to the right. The valve rod of the reciprocation valve is thereby located so that the fluid flows into the right hand end of the reciprocation cylinder 5, forcing the piston 14 out to the left. This pushes the hammer and chisel forward into their splitting stroke. As the chisel comes through the face plate 141 of the main clamp it contacts the slate slab at its center line and continued travel of the carriage pushes the chisel backward with its shank into the hammer casing, compressing the spring 19. This pushes the inclined sloping edge 28 of the shank against the corresponding surface 27 on the slide. Assuming that the hand wheel 26 has been set so that the index reads more than zero, the slide will permit the roller 18 on the shank 9 to move into the path of the corners 15 of the hammer disc 12. As the hammer revolves, one of the corners 15 will strike against the roller, thus giving the chisel an outward blow. Every time a corner 15 passes the roller the latter will be given another blow provided only that the pressure on the edge of the chisel blade has caused the shank to move the roller back again into the path of the revolving disc 12. When the pressure on the edge of the chisel is removed, the coiled spring 19 pushes the shank outwardly and removes the roller from the path of the revolving disc 12. When the hammering action commences the chisel makes such very short movements that it can rebound and the roller will be caught by every corner 15 of the disc 12. As the penetration into the slate for each blow increases, movement of the chisel per blow increases in length. The result is that the interval between successive blows increases.

After the split has started, the pressure required against the slate frequently drops so low that the pressure of the compression spring 19 is sufficient to cause the split to continue. When the chisel has advanced into the slate sufficiently to hold the slab erect, I prefer to have the machine so adjusted that the clamps open at both ends of the slate. This must take place before the split has reached the position at which the discs 143 of the main clamp arms touch the slate; otherwise the slab is liable to break. Experience makes it quite evident that if a pressure of the clamp discs should occur between the apex of the split and the shoulders of the blade, that portion of the slate between these points would be loaded with a high frequency transverse load which if high enough would break the slate. This will occur if the timing of the release of the clamping pressure is not properly adjusted.

At the other end of the slate the release of the front clamp pressure may be a little later, but not very much so, for as the chisel advances into the slate the wedging action of the shoulders of the chisel tears the slate apart along a so-called "cleavage plane," which may not be a true plane. Consequently the far end of the slate must be free to wobble a bit as the chisel seeks to follow the plane of cleavage. To permit this as easily as possible, the abutment consists of a series of rollers 90 above referred to and shown in Fig. 25. The rollers are held against the face plate 142 of the front clamp set by the retainer strip 151.

When the chisel has advanced far enough into the slate, the split will run ahead of the blade and completely separate the slab into two sheets without the blade reaching the end of its travel.

Each sheet will be closely equal to one-half the thickness of the slab.

Let us assume that the slab is to be split into eight shingles, i. e., the slab is an "eighter." The first split results in making two pieces that will make four shingles each. After this split the operator lays the slab on the left of the chisel down on the table top and, holding the other with his right hand upright, he awaits the retreat of the chisel through the face plate of the main clamp. As the chisel reaches the end of its stroke the clamp arms swing out, center the slab and the chisel then splits this right-hand slab in the same manner that it split the original slab. This right-hand slab is, of course, a "fourer" and when split into two parts each is the thickness of two shingles. The operator after the second split, namely, the reduction of the right-hand "fourer" into two "twoers," lays the "twoer" on the left down on top of the previously split "fourer" and, holding the right-hand "twoer" as before, allows the machine to center and split it into two parts each of the desired final thickness. The operator lays these two final thickness pieces down on his right-hand side and with his left hand reaches for the double thickness piece he laid down after the previous split, swings this into place, the machine centers it and splits it into two pieces of the desired final thickness. These two are laid down on top of the two previously finished shingles. The operator then reaches for the left-hand "fourer" which he had placed on the table top, swings this into the machine which centers and splits it into two "twoers." He lays down again the one on the left and holding the one on the right allows it to be centered and split to the desired final thickness. These two shingles are then laid down on the right on the pile of shingles previously made and the "twoer" on the left is swung up into upright position, centered and split. When the two shingles resulting from this final split are laid down on the pile, the operator then places the entire pile on an outgoing or delivery conveyor 150 which is on his right hand, i. e., at the lower left corner of the machine as it appears in Fig. 6. Thus the operator has made eight shingles by means of only seven splits. At the next stroke of the machine, i. e., reciprocation of the carriage, he will probably miss as he reaches to the supply conveyor 149 on the left for another slab. Occasionally strokes will be missed by the operator due to defective slate, extra reaching for slabs, absences from the machine, etc. To enable the operator to readily pick up the slabs and to lay them down, the top plate is provided with holes 152 through the top plate 2.

By means of the reciprocating flow control valve 77 on the front of the machine the operator can set the reciprocation of the carriage of the machine to correspond to his ability to handle the slate. This ability will vary according to the operator's experience and the size of the shingles being made. About twenty shingles per minute, of medium size, can be made by a practised operator.

If the slate breaks, the operator can stop the machine instantly by pushing the handle of the starting valve 74 over to vertical position or he can run the chisel backward for clearing the table top by pushing the handle all the way over and bringing it back to the vertical when the desired position has been attained. When ready to start the machine over again he merely pulls the handle toward himself.

The machine is normally so adapted that the chisel blade never advances as far as the abutment or face plate at the front clamp set. Because the blade always stops several inches away from the abutment there is no danger of the operator's fingers being caught between the blade and the abutment. The stroke of the carriage is determined as before mentioned by placing collars 85 and 86 on the rod 83 at the correct positions for controlling the reciprocating valve 16. The above description covers the general operation of splitting slate in which the split must take place close to the center line of the slab.

Experimentation has shown that with some slates it is possible to commence the split an appreciable distance to one side of the center provided there is an abutment at the other end at a corresponding distance to the other side. When such slate is so set and split the result is a pair of tapered shingles. When such shingles are desired, a "twoer" slate may be put into the machine in which the gears 107 are so placed that the discs 143 on the arms do not meet on the center line of the machine but a little to one side of the center. This effect can be produced by changing the meshing of the two gears with relation to each other. If, for example, in Fig. 16 the gear 107 on the right were raised out of mesh with the other gear, turned clockwise one or more teeth and put down, the discs 143 would come together to the right of the center of the machine. As a result a slab of slate would be centered to the right of the center line of the machine and the chisel would attack the slate to the left of the slab's center. If the same change were made in the construction shown in Fig. 21, the abutment would press against the slate to the left of the center line when viewed in that figure but to the right of the center line of the slab very closely to a certain amount regardless of the thickness of the slab.

The same general effect could be obtained if the sizes of the two gears were different, the shift being toward the size of the smaller gear.

*Modifications*

I wish to describe a modified form of chisel which may be used in my machine. It has long been known that it it not necessary for the blade of the chisel to extend clear across the slate. The chisels used by the hand splitters are usually about 3" across. However, with thin slate it becomes necessary to have wider blades. At about $\frac{1}{16}$" I have found it necessary to use blades wider than the slate. The point must depend upon the strength of slate being used. The narrow chisel which I am now describing is intended to attack the slab at about the middle of the height of the slab as it stands vertically in the plane of cleavage. The chisel is relatively narrow without divisions into fingers and is used when splitting thick blocks into smaller blocks that would come within the capacity of the clamps such as those described in this application or in the V. F. Lake Patents Nos. 1,229,622, dated June 12, 1917, and 1,590,385 (above-mentioned).

When splitting with narrow blades, some slates show curved rippled lines on the cleaved surfaces. These rippled lines originate at the places where the edges of the blade enter the slate and sweeping from there in curves resembling parabolas, go to the far end of the slate. When the blade is wider than the slate these curves are usually not present but when ripples are found they are in long straight lines. Different kinds of slate differ in this respect.

To enable narrow blades to be used when desirable, I provide a detachable chisel support 162 underneath the chisel adjacent the main clamp set. This is shown in dotted position in side elevation in Fig. 7 and separately in side elevation and in plan in Figs. 29, 30 and 31. It consists of a piece of steel, generally oblong in side elevation. The top edge is grooved longitudinally at 163 to receive the tongue on the bottom of the blade of the chisel. The bottom of the support in turn has a tongue to fit into a groove 164 in the bottom of the chisel space of the main clamp and top plate 2 for the usual width chisels (Fig. 6). The left half of the support, i. e., the half nearest the main clamping set, is thinned on both faces so as to be narrow enough to slide between the chisel cleaners. However, at the left edge a lip of the full thickness is left. In this way two shoulders 165 and 166 are formed on each side of the support. While the thin portion of the support is narrow enough to slide between the chisel cleaners, the rear end or lips are so wide that they cannot slide in between the cleaners. The shoulder 165 at the end of the support forms a depression into which the cleaners spring and thus prevent the support moving away from the main clamp set toward the carriage. The shoulder 166 at the point where the thin portion meets the thick portion of the support prevents the support from moving forward toward the slate. At the front edge of the support a recess 167 is cut in the support to enable the operator to insert a screwdriver or similar blade through the chisel opening in the face plate 141 between the ends of the cleaners 153 so that the support can be withdrawn (see Figs. 11 and 28). If desired, such a recess 167 may be placed opposite each pair of cleaners.

It will be seen that I have devised a slate splitting machine which is simple and effective. Not only does the fluid pressure mechanism provide a stepless, self-controlled pressure which automatically adjusts itself to the resistance encountered, without any momentum problems, but the means for causing the reciprocation of the carriage, setting the length of stroke and its reversibility, are all one set of parts of great simplicity. The timing and control of the clamps independently of each other are also a feature of great practical importance.

What I claim is:

1. A slate splitting machine comprising a slate splitting tool, hammer means associated with the tool for imparting a rapid succession of forward impulses to the tool and a movable carriage supporting the tool and hammer means, in combination with fluid drive means having a self-controlled maximum rate of movement adapted to push the carriage toward the slate; whereby the pressure of the tool against the slate is controlled at all times.

2. A slate splitting machine comprising a slate splitting chisel, hammer means associated with the chisel for imparting a rapid succession of forward impulses to the chisel and a movable carriage supporting the chisel and hammer means, in combination with a piston connected to the carriage, a fluid cylinder containing the piston and a valve admitting fluid to the cylinder at a controlled rate; whereby the pressure of the chisel is never more than required to continue the splitting operation.

3. A slate splitting machine according to claim 2 in which there is a manual starting valve associated with the flow valve and cylinder adapted to start, stop or reverse the fluid flow in the cylinder at any point of travel of the carriage.

4. A slate splitting machine comprising a slate splitting tool, hammer means associated with the tool for imparting a rapid succession of forward impulses to the tool, a movable carriage supporting the tool and hammer means, a piston connected to the carriage and a fluid cylinder containing the piston; in combination with an arm moving with the carriage, a reciprocation valve controlling the fluid admitted to the cylinder, and adjustable collars associated with the valve adapted to be acted on by the arm and reverse the valve; whereby the travel of the carriage can be reversed at any point in its travel.

5. A slate splitting machine according to claim 4 in which there is a manual starting valve adapted to cut off or permit the flow of fluid pressure to the reciprocation valve.

6. A slate splitting machine according to claim 1 in which there are fluid means of controlled maximum pressure giving the hammer means its rapid succession of impulses, whereby if the chisel jams in the slate the machine will stall without damage.

7. A slate splitting machine according to claim 6 in which the fluid is incompressible and the maximum pressure is adjustable.

8. A slate splitting machine according to claim 7 in which there is a flow valve in the fluid supply for the cylinder; whereby the rate of movement of the carriage is adjustable.

9. A slate splitting machine comprising a horizontal support for the slate, a chisel with a vertical edge for splitting slate on the support, resilient means pressing the chisel forward, a hammer adapted to impart a rapid succession of forward impulses to the chisel when the latter is pressed back by the slate, a movable carriage supporting the chisel and hammer, and a frame carrying the support and the carriage, in combination with fluid driven means for the carriage having a controlled maximum pressure; whereby the maximum pressure of the chisel on the slate is controlled.

10. A slate splitting machine according to claim 9 in which there is a rotating polygonal disk whose corners are hardened to give the blows to the chisel when pressed back.

11. A slate splitting machine according to claim 10 in which there is a slide to limit the rearward movement of the chisel, and a wheel to regulate the force of the impact of disk on the chisel by adjusting the position of the slide, in combination with an indicating device for the wheel and means to lock the wheel in its setting.

12. A slate splitting machine comprising a horizontal support for the slate, a chisel with a vertical edge for splitting slate on the support, resilient means pressing the chisel forward, a hammer adapted to impart a rapid succession of forward impulses to the chisel when the latter is pressed back by the slate, a movable carriage supporting the chisel and hammer, and a frame carrying the support and the carriage, in combination with fluid driven means having a self-controlled maximum rate of movement adapted to push the carriage toward the slate; whereby the pressure of the chisel on the slate will be only that of the resilient means unless the slate offers greater resistance than can be offset by the pressure of the resilient means.

13. A slate splitting machine according to claim 1 in which there is a support for the slate and a frame carrying the support and the carriage, in combination with slate clamps associated with the support and fluid driven means controlled by the position of the carriage adapted to open and close the clamps.

14. A slate splitting machine according to claim 13 in which the clamp control means is adjustable to operate the clamps at selected points in the travel of the carriage.

15. A slate splitting machine according to claim 14 in which the clamps comprise a forward clamp and a main clamp and the clamp control means comprises a bar moving with the carriage and valves controlling the opening and closing of the clamps; in combination with two tappets one controlling the valves for opening and the other for closing; whereby the clamps can be released and opened at different points in the travel of the carriage.

16. A slate spliting machine comprising a frame, a table on the frame to support the slate, a carriage on the frame movable toward and from the table, and a slate splitting tool carried by the carriage; in combination with two sets of clamps to hold the slate in splitting position, and fluid driven means for operating the clamps; whereby the slate is centered and controlled and uniform pressure of the clamps on the slate is obtained regardless of the thickness of the slate.

17. A slate splitting machine according to claim 16 in which one set of clamps is at the forward end of the slate and the other set at the back end, there being valve means in the clamp operating means whereby one set of clamps are operated after the other set.

18. A slate splitting machine comprising a frame, a table on the frame to support the slate and one or more clamps to hold the slate in splitting position, each clamp comprising at least a pair of opposed arms operated by fluid pressure means, said means including and being controlled by a shutoff valve, a regulating valve and a check valve, the check valve permitting escape of exhaust fluid, whereby rapid opening of the clamps is obtained.

19. A slate splitting machine comprising a frame, a table on the frame to support the slate, one or more clamps to hold the slate in splitting position, each clamp comprising at least a pair of opposed arms, a driving gear for each arm to swing it between open and closed position, the gears of each pair being meshed, and a rack for each pair of gears meshing with one of the pair, in combination with hydraulic rams adapted by pushing on the racks to open or close the clamps.

20. A slate splitting machine according to claim 19 in which there is one hydraulic ram for opening and another for closing one or more pairs of arms of a clamp, the pistons of the two rams being adapted to push their rack in opposite directions, there being tapered valve means in each ram whereby the retracting movement of a piston brings the swing of the arms to an end gradually.

21. A slate splitting machine according to claim 20 in which there is check valve means associated with one or more rams to make the retracting movement of the piston faster than the extending movement.

22. A slate splitting machine according to claim 21 in which there are at least two clamps and a regulating valve associated with one or more rams whereby the operating time periods of the extending movements of the rams can be made different.

23. A slate splitting machine according to claim 22 in which there is a clamp at the front of the table for one end of the slate and a main clamp for the other end of the slate, in combination with check and quantity controlling valves on rams for the clamps at both ends of the table, whereby one clamp can be set to release the slate before the other clamp.

24. A slate splitting machine comprising a frame, a table on the frame to support the slate and a pair of clamping arms to center the slate on the table, in combination with fluid pressure means to operate said arms in which there is provided a shut off valve, a check valve regulating the flow of fluid in one direction and a valve regulating the flow of the fluid in the other direction; whereby the speed of the various parts of the movement of arms can be independently controlled.

25. A slate splitting machine comprising a frame, a support on the frame for the slate, a slate splitting tool and hammer means therefor and a carriage supporting the tool and hammer means, in combination with fluid pressure means driving the carriage in a reciprocatory manner, fluid operated clamps for clamping the slate, a four way valve to control the flow of fluid to the clamps, and adjustable tappets moving with the carriage to reverse the valve and the flow of fluid to the clamps.

26. A slate splitting machine according to claim 1 in which there is a frame, a table to support the slate and an abutment on the table to hold the slate against the chisel blows, there being rollers in the abutment whereby the slate can conform a little laterally if the plane of cleavage is not quite centered.

27. A slate splitting machine according to claim 1 in which there is a horizontal slide supporting the carriage, a vertical slide on which the horizontal slide is mounted and a bracket secured to the vertical slide, together with means for raising and lowering the bracket, whereby the level of the carriage can be changed.

28. A slate splitting machine according to claim 1 in which there is a face plate with a chisel aperture, in combination with a chisel cleaner at the aperture having resilient blades adapted to clean the blade when retracted through the face plate.

EUGENE T. LAKE.

REFERENCES CITED

The following references are of record in the file of this patent:

UNITED STATES PATENTS

| Number | Name | Date |
|---|---|---|
| 1,590,385 | Lake | June 29, 1926 |
| 2,368,138 | Hayden | Jan. 30, 1945 |
| 2,491,901 | Moohl et al. | Dec. 20, 1949 |
| 2,514,352 | Solomito | July 4, 1950 |